(12) United States Patent
Takagi et al.

(10) Patent No.: US 6,271,895 B2
(45) Date of Patent: Aug. 7, 2001

(54) IMAGE OBSERVING APPARATUS FOR OBSERVING OUTSIDE INFORMATION SUPERPOSED WITH A DISPLAY IMAGE

(75) Inventors: Akinari Takagi, Yokosuka; Yoshihiro Saito, Hachioji; Naosato Taniguchi, Urawa; Toshiyuki Sudo, Kawasaki, all of (JP)

(73) Assignee: Mixed Reality Systems Laboratory Inc., Kanagawa-ken (JP)

( * ) Notice: Subject to any disclaimer, the term of this patent is extended or adjusted under 35 U.S.C. 154(b) by 0 days.

(21) Appl. No.: 09/736,242

(22) Filed: Dec. 15, 2000

Related U.S. Application Data

(62) Division of application No. 09/273,746, filed on Mar. 22, 1999.

(30) Foreign Application Priority Data

| Jul. 27, 1998 | (JP) | 10-211060 |
| Sep. 22, 1998 | (JP) | 10-267653 |
| Mar. 12, 1999 | (JP) | 11-066495 |

(51) Int. Cl.$^7$ .......................... G02F 1/1335; G09G 5/00; G02B 27/14
(52) U.S. Cl. .................. 349/11; 349/8; 345/7; 359/630
(58) Field of Search ............. 349/11, 8, 9; 345/6, 345/7, 87; 359/15, 458, 464, 618, 630, 629; 353/31, 81

(56) References Cited

U.S. PATENT DOCUMENTS

| 5,106,179 | 4/1992 | Kamaya et al. | 351/158 |
| 5,379,132 | 1/1995 | Kuwayama et al. | 359/13 |
| 5,379,135 | 1/1995 | Nakagaki et al. | 359/40 |
| 5,541,705 | 7/1996 | Kan et al. | 354/432 |
| 5,577,826 * | 11/1996 | Kasama et al. | 353/31 |
| 5,579,161 * | 11/1996 | Sekiguchi | 359/559 |
| 5,583,669 | 12/1996 | Fushimi et al. | 349/5 |
| 5,621,486 * | 4/1997 | Doany et al. | 359/621 |
| 5,666,226 * | 9/1997 | Ezra et al. | 359/621 |
| 5,715,023 | 2/1998 | Hoppe | 349/11 |
| 5,719,701 | 2/1998 | Sudo | 359/464 |
| 5,757,348 * | 5/1998 | Handschy et al. | 345/89 |
| 5,790,284 | 8/1998 | Taniguchi et al. | 359/15 |
| 5,880,883 | 3/1999 | Sudo | 359/462 |
| 5,943,171 * | 8/1999 | Budd et al. | 359/631 |
| 5,945,965 | 8/1999 | Inoguchi et al. | 345/6 |
| 6,023,253 * | 2/2000 | Taniguchi et al. | 345/7 |
| 6,195,136 * | 2/2001 | Handschy et al. | 349/5 |

FOREIGN PATENT DOCUMENTS

| 0 177 134 | 4/1986 | (EP) . |
| 0 361 559 | 4/1990 | (EP) . |
| 0 759 603 | 2/1997 | (EP) . |
| 0 825 470 | 2/1998 | (EP) . |
| 0 840 159 | 5/1998 | (EP) . |
| 2 722 582 | 1/1996 | (FR) . |
| 2 272 980 | 6/1994 | (GB) . |
| 6-265887 | 9/1994 | (JP) . |
| 2840692 | 10/1998 | (JP) . |

* cited by examiner

*Primary Examiner*—William L. Sikes
*Assistant Examiner*—Tarifur R. Chowdhury
(74) *Attorney, Agent, or Firm*—Fitzpatrick, Cella, Harper & Scinto

(57) ABSTRACT

An image observing apparatus is arranged to observe outside information from the outside and a display image displayed on an image display device via an optical combiner and via an eyepiece lens superimposed. The outside information and the display image are imaged so as to be superimposed on a surface of a spatial modulator having a two-dimensional pixel structure. Part or all of the outside information and display image is selected on an area basis by the spatial modulator. The outside information and image information thus selected is observed through the eyepiece lens.

14 Claims, 18 Drawing Sheets

IMAGE OBSERVING APPARATUS FOR OBSERVING OUTSIDE INFORMATION SUPERPOSED WITH A DISPLAY IMAGE

This application is a division of application Ser. No. 09/273,746 filed Mar. 22, 1999.

BACKGROUND OF THE INVENTION

1. Field of the Invention

The present invention relates to an image observing apparatus arranged to enable an observer to observe a scene of the outside (outside information) and an image (display image) presented by a display device (image display means) in a single field or to an image observing apparatus intended to permit the observer to have various pseudo-experiences by superimposing an image artificially produced by a computer or the like or a picture recorded by a video system or the like on the real scene (outside information) directly observed by the observer.

2. Related Background Art

FIG. 18 is a schematic diagram to show the main part of a conventional image observing apparatus arranged to permit the observer to observe both the outside information and the display image in a single field. In FIG. 18, an image produced by computer graphics or the like is displayed on display 101, the image is reflected via a half mirror 102 by a concave mirror 103, the image is projected again via the half mirror 102 at a fixed magnification onto the eye 104 of the observer, and at the same time, the real scene of the outside world where the observer exists is superimposed through the half mirror 102 on the image to permit the observer to directly observe a superimposed image.

The apparatus of this structure has, for example, such an advantage that a worker, while carrying out an actual work, simultaneously obtains information necessary for the work through characters, a picture, etc. displayed on the display 101, and can be applied to such use.

In another application, the apparatus can also be applied to a head-mounted observing apparatus arranged to enable the observer to have various pseudo-experiences, for example, in such a manner that images of vase 106 with parallax are produced by computer graphics or the like and are displayed on respective displays for the left and right eyes of the observer whereby the observer looks as if the vase 106 exists on a desk 105 in the real space as illustrated in FIG. 19.

In the conventional observing apparatus, however, the images displayed on the displays are seen as a virtual image for the observer's eyes and, therefore, the displayed images are observed as a transparent or see-through image.

There thus arises a problem that the display images such as characters, the picture, or the like displayed on the displays become too dark to look in circumstances where the outside information is too bright, particularly, outside where the sunlight is strong. A conceivable countermeasure is to adjust the amount of the light from the outside by a filter or the like, so as to improve the visibility of the display screen. It was, however, impossible to adjust the light quantity only in the background part of the characters or the picture.

When the vase produced by computer graphics or the like is intended to be superimposed on the desk present in the real space so as to allow the observer to view the vase as if it is actually present on the desk, the vase looks see-through and thus a sight is different from that in the case where an actual vase is present. If a black image is attempted to be displayed, it will also become see-through and will not be able to be displayed.

In order to avoid this phenomenon, it is also conceivable to employ a method for converting the scene of the real world to an electric signal by a photographing apparatus such as a CCD camera or the like and synthesizing it with an imaginary image produced by computer graphics or the like. In this case, however, the quality of the scene of the real world is dependent on the resolving power of the camera and it is the present status that an image with a higher resolution than that of the images observed directly through the eyes cannot be obtained. There was, therefore, an unavoidable issue that the scene observed was different from that in the real world.

SUMMARY OF THE INVENTION

An object of the present invention is to provide an image observing apparatus that makes both the display image and the outside image easier to see by accurately intercepting the outside information from the outside in the background part of the image (display image) displayed on the display (image display means) in correspondence to the display image or to provide an image observing apparatus that permits good observation of both images by preventing the imaginary image from becoming see-through when the imaginary image (display image) produced by computer graphics or the like is superimposed on the scene in the real space (the outside information).

An image observing apparatus of the present invention includes:

(1-1) an image observing apparatus arranged to observe outside information from the outside and a display image displayed on image display means via optical path combining means and via an eyepiece lens superimposed, wherein the outside information and the display image are imaged so as to be superimposed on a surface of a spatial modulator having a two-dimensional pixel structure, part or all of the outside information and display image is selected on an area basis by said spatial modulator, and the outside information and image information thus selected is observed through said eyepiece lens.

Another embodiment of the image observing apparatus of the present invention includes:

(1-2) an image observing apparatus arranged to observe outside information from the outside and a display image displayed on image display means via optical path combining means and via an eyepiece optical system superimposed, wherein the outside information is imaged on a spatial modulator having a two-dimensional pixel structure, part or all of the outside information and said display means is selected on an area basis by the spatial modulator, and the outside information and image information thus selected is observed through said eyepiece optical system.

Particularly, in the structure (1-1) or (1-2), the image observing apparatus is characterized:

(1-2-1) in that said outside information is imaged on the surface of said spatial modulator by an imaging optical system.

In the structure (1-1), the image observing apparatus is characterized:

(1-2-2) in that said display image is imaged on the surface of said spatial modulator by an imaging optical system.

In the structure (1-1) or (1-2), the image observing apparatus is characterized:

(1-2-3) in that said outside information and display image imaged on the surface of said spatial modulator are comprised of linearly polarized light beams perpendicular to each other;

(1-2-4) in that said spatial modulator comprises a transmission type liquid crystal panel;

(1-2-5) in that said spatial modulator comprises a reflection type liquid crystal panel;

(1-2-6) in that said spatial modulator and said image display means are constructed of a single member;

(1-2-7) in that said outside information is input into image input means and operation of said spatial modulator is controlled based on a signal from the image input means and a signal from said image display means;

(1-2-8) in that said image display means comprises a liquid crystal panel, a light source for illuminating the liquid crystal panel, and a polarizing member for controlling a state of polarization of a beam from the liquid crystal panel;

(1-2-9) in that the display image displayed on said image display means is an imaginary image produced by computer graphics;

(1-2-10) in that said display image is two-dimensional image information or/and three-dimensional image information;

(1-2-11) in that a focal length of an imaging optical system for imaging said outside information on said spatial modulator is substantially equal to a focal length of said eyepiece optical system;

(1-2-12) in that a field lens is disposed near said spatial modulator;

(1-2-13) in that operation of said spatial modulator is controlled based on a signal from said image display means;

(1-2-14) by comprising image pickup means for picking up said outside information;

(1-2-15) in that said image pickup means shares part of said imaging optical system;

(1-2-16) by comprising transmitting means for transmitting image information from said image pickup means to said display means;

(1-2-17) in that operation of said spatial modulator is controlled based on signals from said image pickup means and from said image display means; and so on.

Another embodiment of the image observing apparatus of the present invention includes:

(1-3) an image observing apparatus arranged to observe outside information from the outside and a display image displayed on image display means via optical path combining means superimposed, said image observing apparatus comprising a spatial modulator having a two-dimensional pixel structure, and control means for modulating at least a partial area of the spatial modulator to permit switching of observation between a beam composing said outside information and a beam composing said image information and for controlling said spatial modulator so as to intercept or reduce the beam in an area of said outside information in accordance with an area of said image information.

Particularly, the image observing apparatus is characterized:

(1-3-1) in that the beam composing said outside information and the beam composing said image information are beams having respective polarization states different from each other and said spatial modulator comprises a transmission type liquid crystal panel.

Still another embodiment of the image observing apparatus of the present invention includes:

(1-4) an image observing apparatus arranged to observe outside information from the outside and a display image displayed on image display means via optical path combining means superimposed, said image observing apparatus comprising image pickup means for picking up said outside information and a spatial modulator having a two-dimensional pixel structure, said image observing apparatus further comprising control means for modulating at least a partial area of the spatial modulator to permit switching of observation between a beam composing said outside information and a beam composing said image information, for controlling said spatial modulator so as to intercept or reduce the beam in an area of said outside information in accordance with an area of said image information, and for complementing a peripheral area around said area of the image information with the information picked up by said image pickup means so as to prevent a dark area from appearing in the peripheral area around said area because of an eclipse of the beam.

Particularly, the image observing apparatus is characterized:

(1-4-1) in that the beam composing said outside information and the beam composing said image information are beams having respective polarization states different from each other and said spatial modulator comprises a transmission type liquid crystal panel.

In the structure (1-3) or (1-4), the image observing apparatus is characterized:

(1-4-2) in that said display image is two-dimensional image information or/and three-dimensional image information.

An image observing apparatus for head-mount use according to the present invention includes:

(2-1) an image observing apparatus for head-mount use, two of the image observing apparatus as set forth in either one of the structures (1-1) to (1-4) being mounted for the tight eye and the left eye of an observer.

DETAILED DESCRIPTION OF THE PREFERRED EMBODIMENTS

Embodiments of the present invention will be described below. The image observing apparatus of the present invention is arranged in such a manner that the observer observes a scene in the real space (outside information) and an image (display image) formed on a surface of a two-dimensional or three-dimensional image information display device (hereinafter referred to as a display) via a spatial modulator comprised of a liquid crystal device or the like having two-dimensional pixel structure (the spatial modulator will be referred to hereinafter as a liquid crystal shutter) through an eyepiece optical system.

At this time, the liquid crystal shutter is operated so that pixels corresponding to an arbitrary area in the images selectively transmit either the scene in the real space or the display image.

For example, the light from the scene in the real space and the light from the display image is arranged to have their respective polarization components perpendicular to each other and the operation of the liquid crystal shutter is controlled pixel by pixel so that the display image is transmitted when the liquid crystal shutter is off but the real scene is transmitted when the liquid crystal shutter is on.

This operation permits the observer to observe only either one image in an area where the object image in the real space is superimposed on the imaginary image displayed on the display. This solves the problem that the display image on the display is hard to see because of strong external light and also prevents the imaginary image presented by the display from being seen through.

Figure 1:
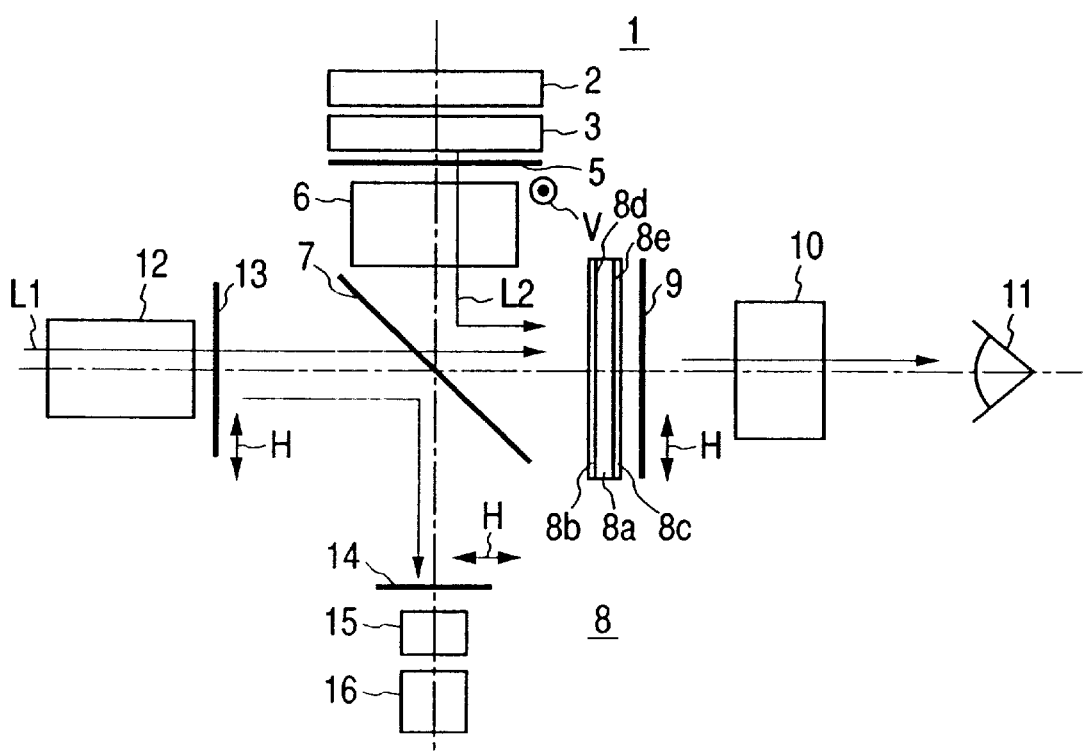
FIG. 1 is a side view to show the schematic structure associated with Embodiment 1 of the present invention.

Each of the embodiments of the present invention will be described below. FIG. 1 is a schematic diagram to show the main part of the optical system in Embodiment 1 of the present invention.

In the figure, reference numeral 1 designates a display device (image display means) for displaying two-dimensional image information (or three-dimensional image information), which has a light source (surface illuminant) 2 and a liquid crystal panel 3 capable of electrically controlling transmission of light from the light source 2 every pixel. A polarizing plate 5 provided in front of this liquid crystal panel 3 has the axis of polarization along the normal direction (denoted by symbol V in the figure) to the plane of the drawing.

Reference numeral 6 denotes an imaging optical system for imaging the image (display image) displayed on the liquid crystal panel 3 of the display device 1 via half mirror 7 on a liquid crystal device surface 8a of liquid crystal shutter 8, and numeral 7 the half mirror (optical path splitting means).

The liquid crystal shutter 8 is composed of a liquid crystal element 8a interposed between transparent members 8b, 8c, and a polarizing plate 9 having the axis of polarization along a direction H parallel to the plane of the drawing. The liquid crystal shutter 8 has the so-called TFT liquid crystal panel structure in which transparent electrodes 8d, 8e and active devices (not illustrated) corresponding to the respective pixels are provided in a matrix pattern on the liquid crystal surface side of the transparent members 8b, 8c in order to control the operation of the liquid crystal element pixel by pixel.

Numeral 10 represents an eyepiece optical system and 11 the eye of the observer. Numeral 12 indicates an imaging optical system (optical system) for imaging image light (outside information) L1 from an object in the outside in the form of an erect real image on the liquid crystal element surface 8a of the liquid crystal shutter 8, and 13 a polarizing plate having the axis of polarization along the direction H parallel to the plane of the drawing.

Numeral 14 also denotes a polarizing plate having the axis of polarization along the direction H parallel to the plane of the drawing similarly, and 15 an image pickup optical system to form the image from the outside on a surface of a image pickup device 16.

The focus of the image pickup optical system 15 is adjusted in synchronism with the imaging optical system 12 so as to always focus the image light from the outside on the surface of the image pickup device 16.

Figure 2A:
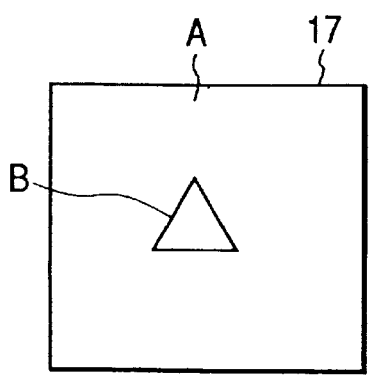
FIG. 2A and FIG. 2B are explanatory diagrams to illustrate synthesis of a real image and an imaginary image.
Figure 7:
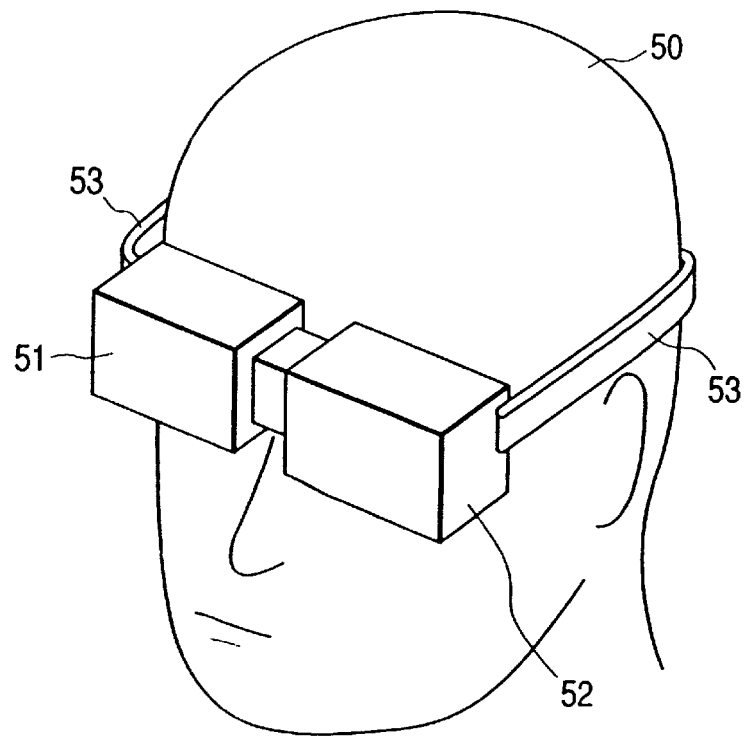
FIG. 7 is a perspective view to show a state in which the image observing apparatus according to the present invention is mounted on an observer.

The apparatus of the above structure is incorporated as image observing devices 51, 52 for the left and right eyes of the observer 50 as illustrated in FIG. 7, which are detachably secured on the observer's head by a fastening device 53. The operation of the present embodiment will be described next. Now, let us describe a case, as illustrated in FIG. 2A, in which the imaginary image (display image) produced by computer graphics or the like is displayed on the scene of the outside (outside information) A in the observer's field of view (the portion surrounded by frame 17).

In FIG. 1, the image light L1 from the outside passes through the half mirror 7 and thereafter is focused as an erect image on the liquid crystal element surface 8a of the liquid crystal shutter 8 by the imaging optical system 12.

This image light L1 becomes light having the polarization component parallel to the plane of the drawing because of the polarizing plate 13.

Figure 6:
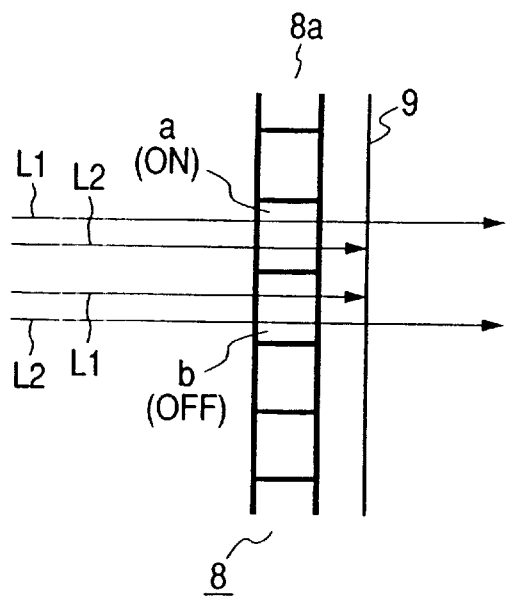
FIG. 6 is an explanatory diagram to illustrate a liquid crystal shutter.

As illustrated in FIG. 6, when the pixels of the liquid crystal shutter 8 are in the on state (a in the figure), the polarization axis of the image light L1 is not changed (in the case of the TN liquid crystal) and thus the image light L1 focused on the liquid crystal element surface 8a is transmitted by the polarizing plate 9 as it is. Therefore, the image light L1 reaches the observer's eye through the eyepiece optical system 10.

When the pixels of the liquid crystal shutter 8 are in the off state (b in the figure), the polarization axis of the image light L1 from the outside is rotated into the direction normal to the plane of the drawing by the liquid crystal element 8a, so that the image light is intercepted by the polarizing plate 9 and does not reach the observer's eye.

On the other hand, the image light L2 displayed on the display 1 is reflected by the half mirror 7 and thereafter focused on the liquid crystal element surface 8a of the liquid crystal shutter 8 by the imaging optical system 6. This image light L2 becomes light having the polarization component normal to the plane of the drawing because of the polarizing plate 5 having the polarization axis along the normal direction V to the plane of the drawing. Therefore, the image light L2 is intercepted by the polarizing plate 9 with the pixels of the liquid crystal shutter 8 being in the on state (a in FIG. 6) while it is transmitted by the polarizing plate 9 with the pixels of the liquid crystal shutter 8 being in the off state (b in FIG. 6), thus reaching the observer's eye 11 through the eyepiece optical system 10.

For displaying the imaginary image B from the display 1 over the image A of the scene of the outside, the pixels corresponding to the area of A (see FIG. 2A) are thus held on and the pixels corresponding to the area of B are held off, while successively scanning the liquid crystal shutter 8 pixel by pixel.

Figure 8:
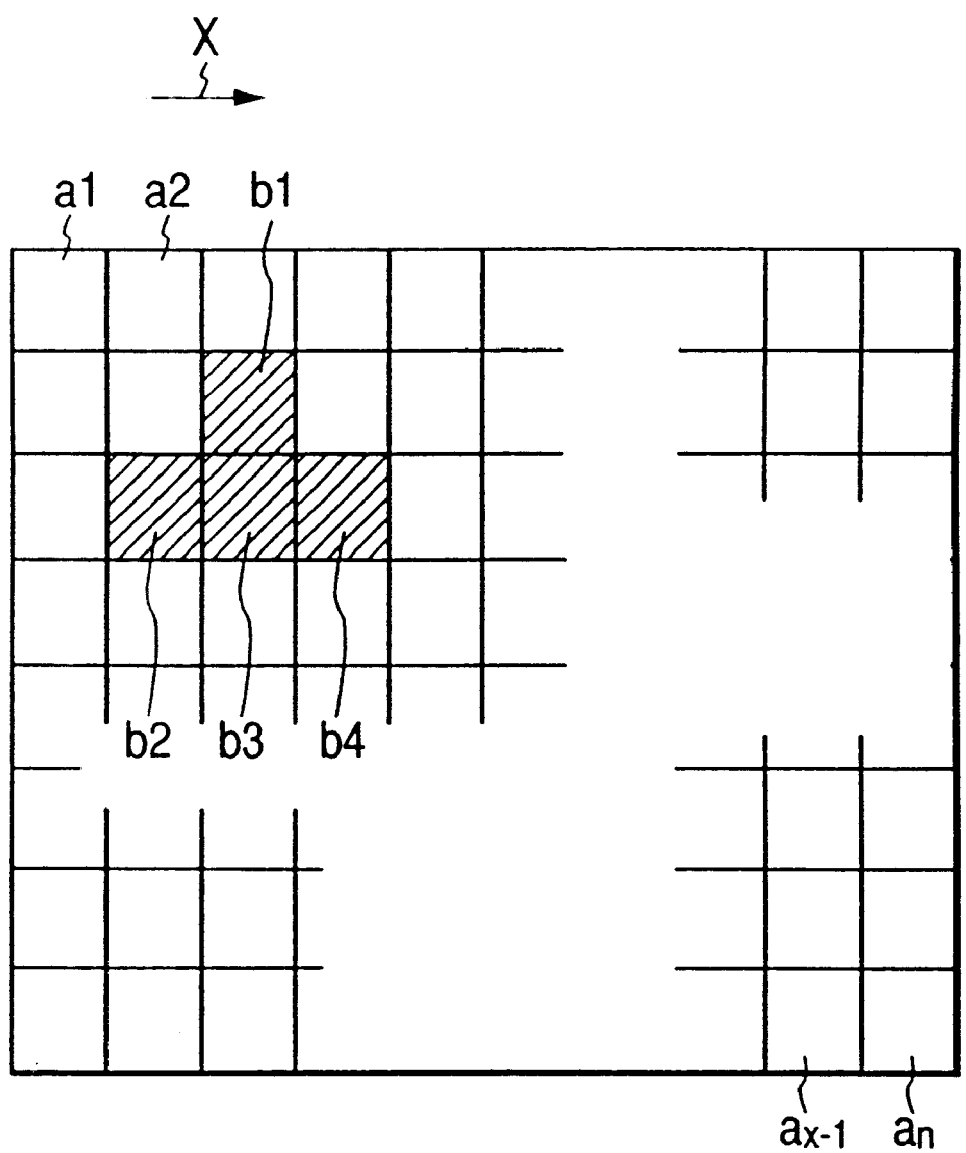
FIG. 8 is an explanatory diagram to show an image pattern formed on the liquid crystal shutter in the present invention.
Figure 9:
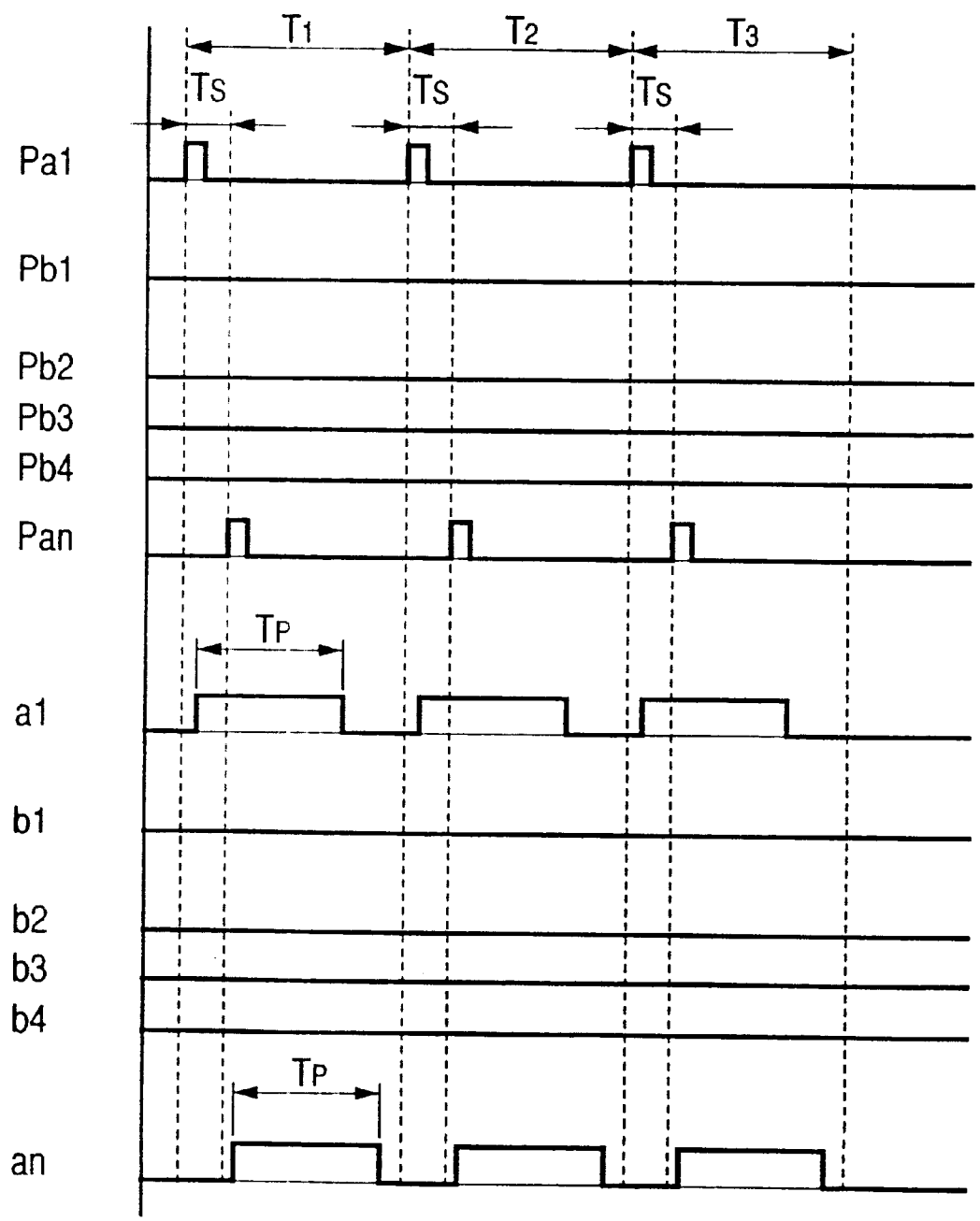
FIG. 9 is a timing chart associated with the present invention.

FIG. 8 is a schematic diagram to show a state in which a pattern comprised of the outside image A and the imaginary image B is formed on the surface of the liquid crystal shutter 8 by the above operation and FIG. 9 is a timing chart thereof.

In FIG. 8, a1 to an indicate the pixels corresponding to the scene image A of the outside and b1 to b4 (pixels indicated by hatching) indicate the pixels corresponding to the imaginary image B. The scan operation is carried out in the X direction from the start point of the pixel a1 at the left upper corner as illustrated in the same figure and is terminated at the pixel an at the right lower corner. This scan operation is carried out during periods Ts illustrated in FIG. 9. For the pixels a1 to an corresponding to the area of the scene image A of the outside, drive pulses Pa1 to Pan are successively generated according to the scan operation. This turns the pixels a1 to an on and the on state is held for a certain period (indicated by Tp in the drawing) as illustrated in FIG. 9. For the pixels b1 to b4 corresponding to the area of the imaginary image B from the display, no drive pulse P is generated, so that the pixels b1 to b4 are kept off. An image forming operation for one frame is completed within the time T1. Then the scan operation is started again and the drive pulses P are generated for the pixels to be turned on. The frame forming operation is carried on in the order of T2, T3, . . . .

The above operation results in forming the image pattern comprised of the area A to transmit only the image light L1 of the outside and the area B to transmit only the display image light L2 from the display as illustrated in FIG. 2A, on the liquid crystal display surface 8a of the liquid crystal shutter 8.

The observer selectively observes the scene image of the outside and the display image from the display 1 through the eyepiece optical system 10, based on the images formed on the liquid crystal display surface 8a of the liquid crystal shutter surface 8.

Therefore, the above structure and operation overcome the problem that the image displayed on the display 1 is hard to see even in the circumstances where the light L1 from the outside is strong, for example, in the outdoor circumstances, and also solve the problem that the imaginary image formed on the display 1 by computer graphics or the like is seen through.

Figure 2B:
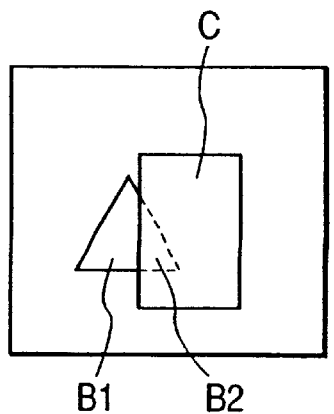

In cases where there is no positional relation between the scene of the outside and the imaginary image displayed on the display 1, for example, in cases where characters are simply displayed in the observer's field of view or an image is displayed as a monitor, the display can be achieved by carrying out the above-stated operation control of the liquid crystal shutter 8 for pixels corresponding to a predetermined area; however, in cases where there is a certain positional relation between the actual scene and the imaginary image, for example, where a portion B2 of the imaginary image B is interrupted by an object C in the actual scene as illustrated in FIG. 2B, the following consideration is necessary. Such cases will be discussed below.

In FIG. 1 part of the scene image L1 from the outside is reflected by the half mirror 7 to reach the polarizing plate 14 having the polarization axis H parallel to the plane of the drawing. Since the image light L1 from the outside is the light having the polarization component parallel to the plane of the drawing because of the polarizing plate 13, it passes through the polarizing plate 14 as it is and is then focused on the image pickup surface of the image pickup device 16 by the image pickup optical system 15.

On the other hand, part of the image light L2 displayed on the display 1 passes through the half mirror 7 to reach the polarizing plate 14, but it is intercepted by the polarizing plate 14, because the polarization component of the image light L2 is normal to the plane of the drawing. Therefore, the image pickup device 16 can always pick up only the scene of the outside and take in the image as image information.

Here, the picked up image is set to be approximately equal to the area of the image formed on the liquid crystal shutter 8 and observed by the observer. Therefore, the image information obtained is the same as the observer is observing.

The scene image from the outside, captured by the image pickup device 16, is electrically processed by an image processing circuit (not illustrated) to extract an outline C of the real object image in the real scene. At the same time, information is also taken in about the positional relation between the observer and the object image. This positional information is calculated from the parallax between the images picked up by the image pickup devices 16 in the image observing devices 51, 52 provided for the left and right eyes of the observer 50, illustrated in FIG. 7. It is a matter of course that the positional information can also be obtained by means of a position detecting sensor such as a magnetic sensor or the like provided separately.

From these outline information of the real object image and positional information, an area to be displayed on the display 1 is calculated for the imaginary object image B displayed on the display 1. In the area B1 where the imaginary object image is seen, the pixels of the liquid crystal shutter 8 corresponding thereto are held off to transmit only the image light L2 from the display 1; in the other area than the area B1, including the area B2 interrupted by the real object image C, the pixels of the liquid crystal shutter 8 are held on to transmit only the scene image light L1 from the outside.

At this time, if the parallax is provided between the imaginary object images B to be projected onto the left and right eyes, based on the positional information between the observer and the object image in the real space, as illustrated in FIG. 7, the imaginary object images B will be observed as a stereoscopic image and the observer will observe the imaginary object B as if it is present in the real scene.

The image of the outside observed through the eyepiece optical system 10 after focused on the liquid crystal shutter 8 is an image obtained optically, different from images once converted into an electronic form through a video camera or the like. Therefore, it can be observed as an image having the quality substantially equal to that of the direct vision of the real scene like the vision through binoculars or the like.

If a scan operation from the left upper corner to the right lower corner on the liquid crystal surface of the liquid crystal shutter 8 is defined as one frame and on and off operations are repeated for the pixels corresponding to the area of the imaginary image B illustrated in FIG. 2A every frame, the observer will alternately observe the image light L1 from the outside and the image light L2 displayed on the display, so that the imaginary image B can also be seen in a see-through state as in the case of the conventional apparatus.

Figure 3:
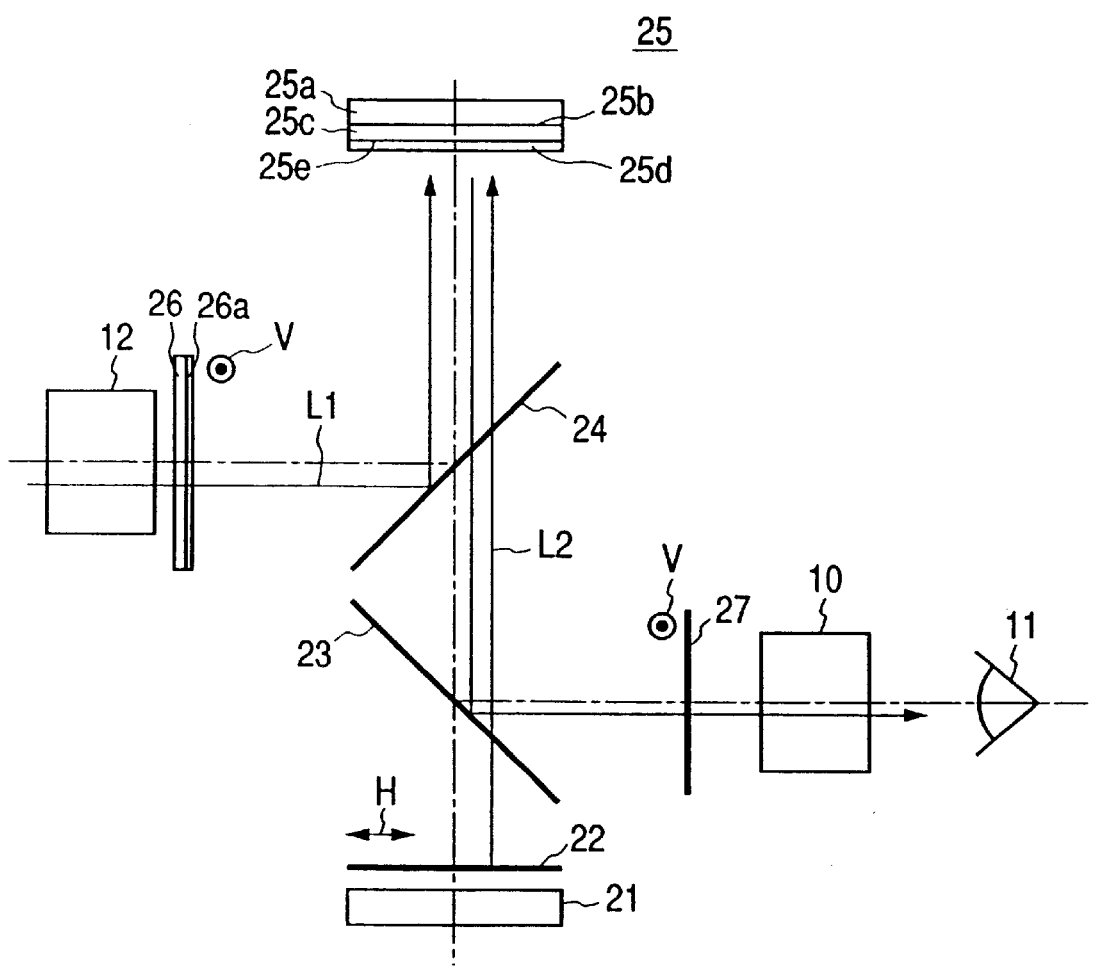
FIG. 3 is a side view to show the schematic structure associated with Embodiment 2 of the present invention.

FIG. 3 is a schematic diagram to show the main part of Embodiment 2 of the present invention. In the present embodiment, the display device for displaying two-dimensional image information is also provided with the function of the liquid crystal shutter described in Embodiment 1, thereby simplifying the structure of the apparatus. In the figure the elements having the same functions as those described above are denoted by the same reference symbols.

The apparatus of FIG. 3 will be explained. Numeral 21 designates a light source for illuminating the display, which is comprised of LEDs or the like for emitting respective color beams of R (red), G (green), and B (blue). Numeral 22 denotes a polarizing plate having the axis of polarization along the horizontal direction, and numerals 23 and 24 denote half mirrors. Numeral 25 represents a reflective liquid crystal display, which has a silicon wafer 25*a* with transistor circuits for driving the liquid crystal and a reflective surface 25*b* made of aluminum or the like also serving as electrodes, a liquid crystal element 25*c*, and a transparent member 25*d* having a transparent electrode 25*e*. The display has a matrix of pixels and the operation is electrically controllable pixel by pixel.

Numeral 26 indicates a liquid crystal shutter which does not have the pixel structure but has the shutter structure for simultaneously carrying out control of transmission of the outside light L1 throughout the entire surface, different from the liquid crystal shutter 8 described above. A polarizing plate 26*a* provided on a device-side surface of this liquid crystal shutter 26 has the axis of polarization along the normal direction to the plane of the drawing. Numeral 27 denotes a polarizing plate having the axis of polarization along the normal direction to the plane of the drawing.

The operation of the present embodiment will be described next. The light L2 from the illumination light source 21 passes through the polarizing plate 22 and then through the half mirrors 23, 24 to be reflected by the reflective surface 25*b* of the display 25. The light then passes through the half mirror 24 and is reflected by the half mirror 23 to reach the polarizing plate 27. When a pixel of the reflective liquid crystal display 25 is in the on state, the light is reflected and thereafter modulated to become light having the polarization component in the normal direction to the plane of the drawing.

Figure 10:
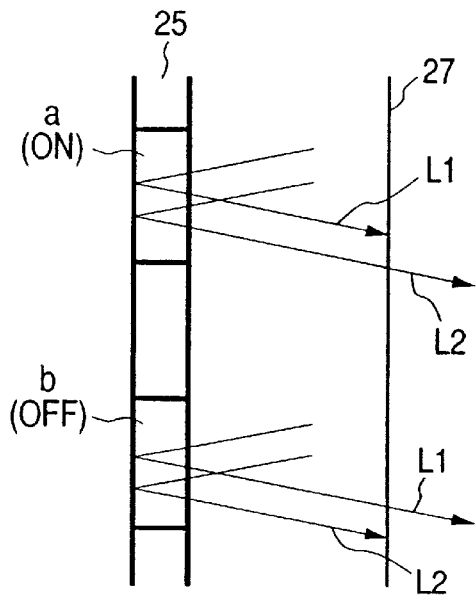
FIG. 10 is an explanatory diagram to illustrate the liquid crystal shutter associated with the present invention.

Therefore, the light L2 from the light source 21, having the polarization component parallel to the plane of the drawing because of the polarizing plate 22, is transmitted by the polarizing plate 27 having the polarization axis along the direction normal to the plane of the drawing, as illustrated in FIG. 10. When the reflective liquid crystal display 25 is in the off state, the light is intercepted by the polarizing plate 27, because the polarization direction is maintained even after the light is reflected.

On the other hand, the image light L1 from the outside is reflected by the half mirror 24 and is focused on the reflective surface 25*b* of the reflective liquid crystal display 25 by the imaging optical system 12. Then this image light L1 is reflected by the reflective surface 25*b* of the reflective liquid crystal display, further passes through the half mirror 24, is reflected by the half mirror 23, and thereafter reaches the polarizing plate 27.

When the reflective liquid crystal display 25 is in the on state, the image light L1 from the outside, reflected by the reflective surface 25*b* of the reflective liquid crystal display 25, is modified as described above to become light having the polarization component along the direction parallel to the plane of the drawing. Therefore, the light L1 is intercepted by the polarizing plate 27 as illustrated in FIG. 10.

When the reflective liquid crystal display 25 is in the off state, the light L1 maintains the polarization direction even after reflected. Therefore, the light L1 has the polarization axis along the normal direction and is thus transmitted by the polarizing plate 27.

As described above, only the light from the light source 21, which is the image light L2 corresponding to the image pattern formed on the display based on image information, reaches the observer's eye when the reflective liquid crystal display 25 is in the on state; whereas only the light L1 from the outside reaches the observer's eye when the reflective liquid crystal display 25 is in the off state.

Figure 11:
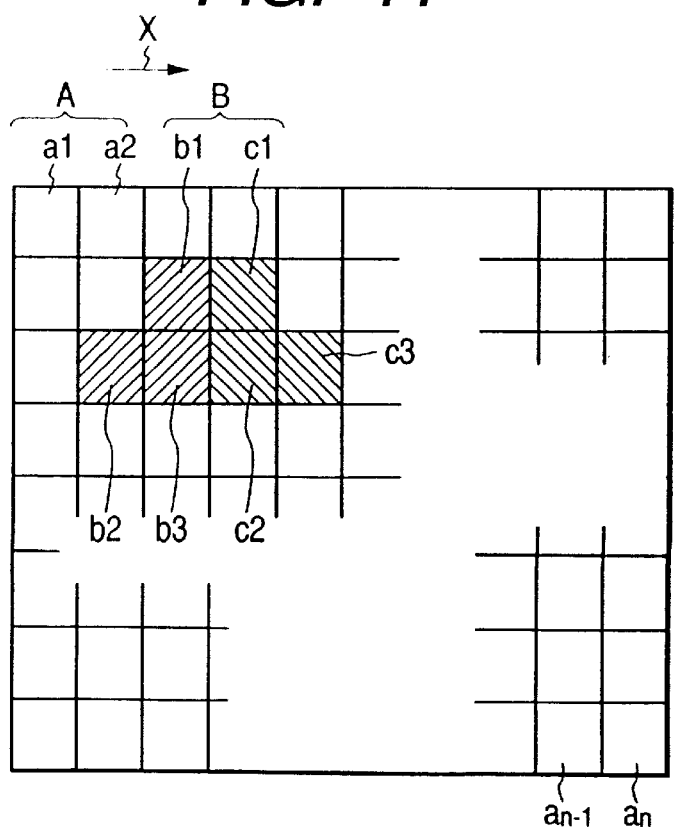
FIG. 11 is an explanatory diagram to show an image pattern formed on the liquid crystal shutter in the present invention.
Figure 12:
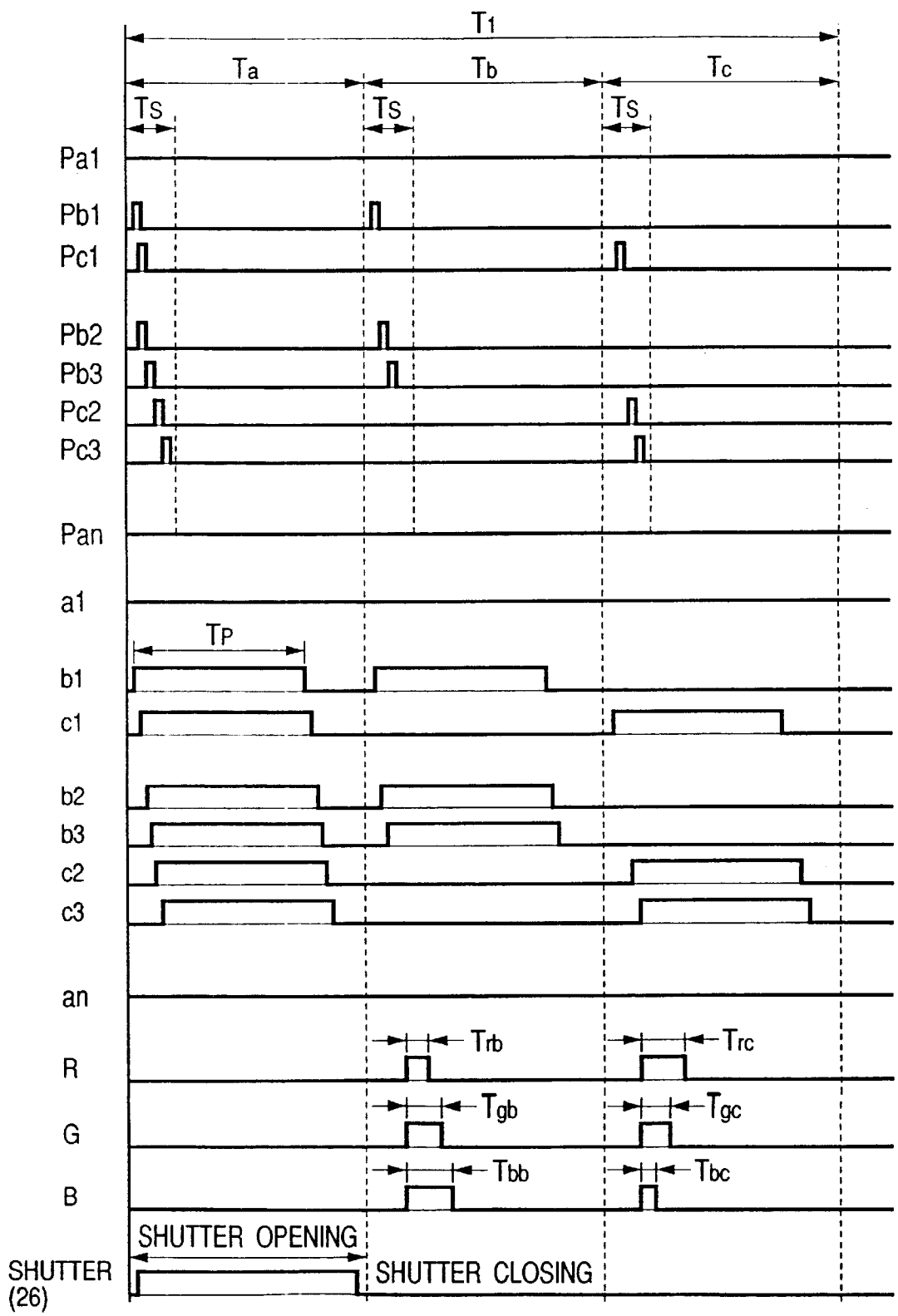
FIG. 12 is a timing chart associated with the present invention.

FIG. 11 is a schematic diagram to show a state in which a pattern comprised of the scene image of the outside and the image based on the image information is formed on the reflective liquid crystal display surface, and FIG. 12 is a timing chart thereof.

In FIG. 11, a1 to an represent pixels corresponding to the scene image of the outside (this area will be referred to as A) and b1, b2, b3, c1, c2, c3 (pixels indicated by hatching) pixels corresponding to the image based on the image information (this area will be referred to as B). Further, letters b and c indicate pixels having different colors.

The scan operation is carried out in the X direction from the start point of the pixel a1 at the left upper corner and is terminated at the pixel an at the right lower corner as illustrated in the figure.

This scan operation is carried out during periods Ts illustrated in FIG. 12. First, drive pulses Pb1, Pb2, Pb3, Pc1, Pc2, Pc3 are successively generated for the pixels b1, b2, b3, c1, c2, c3 corresponding to the image area B according to the scan operation. This turns the pixels b1, b2, b3, c1, c2, c3 on and the on state is held for a certain period (indicated by Tp in the drawing) as illustrated in FIG. 12. No drive pulse P is generated for the pixels a1 to an corresponding to the image area A, so that the pixels a1 to an are kept in the off state. The time of this sequential operation is indicated by Ta. During this time Ta the liquid crystal shutter 26 is kept open and the illumination light source 21 is in the off state. Therefore, the observer observes only the scene of the outside corresponding to the area A through the eyepiece optical system 10 during the period Ta.

After a lapse of the time Ta, the scan operation is started again to generate the drive pulses Pb1, Pb2, Pb3 for the pixels b1, b2, b3 among the pixels corresponding to the image area B. This turns the pixels b1, b2, b3 on during the period Tp.

At this time, each LED of R, G, or B of the light source 21 for illumination is turned on during the period of Trb, Tgb, or Tbb, respectively. This on time Trb, Tgb, or Tbb of each LED is set to a predetermined duration of time corresponding to the color of the pixels b.

The time of this sequential operation is indicated by Tb. During this time Tb, the shutter 26 is in the closed state. Therefore, the observer observes only the area of the pixels b1, b2, b3 of the color b in the image area B through the eyepiece optical system 10 during the period Tb.

After a lapse of the time Tb, the scan operation is started again to generate the drive pulses Pc1, Pc2, Pc3 for the pixels c1, c2, c3 among the pixels corresponding to the image area B. This turns the pixels c1, c2, c3 on during the time of Tp.

At this time, each LED of R, G, or B of the illumination light source 21 is turned on during the time of Trc, Tgc, or Tbc, respectively. The on time Trc, Tgc, or Tbc of each LED is set to a predetermined duration of time corresponding to the color of the pixels c, similarly to the pixels b.

The time of this sequential operation is indicated by Tc. During this time Tc, the shutter 26 is in the closed state. Therefore, the observer observes only the area of the pixels c1, c2, c3 of the color c in the image area B through the eyepiece optical system 10 during the period Tc.

According to the above operations indicated by the times Ta, Tb, Tc, the image pattern of one frame is formed on the reflective display.

Here, kinds of colors to be reproduced can be increased by increasing kinds and combinations of on times Tr, Tg, and Tb of R, G, and B of the illumination light source.

In that case, however, the periods of the times Ta, Tb, and Tc become shorter according to the kinds and, therefore, the kinds of available colors are determined taking the operational characteristics of the liquid crystal device used etc. into consideration.

As described above, the image pattern described above can be formed in time division of the time T1 for formation of one frame into the times Ta, Tb, and Tc. However, in cases where the image displayed on the liquid crystal display is monochromatic like characters etc., one frame does not have to be formed by the three operations during the times Ta, Tb, Tc, but it can be formed within the time of Ta (=Tb=Tc), as in Embodiment 1. In such cases, the shutter 26 can be only the polarizing plate 26a and the illumination light source 21 can be kept in the on state.

As described above, the selective emission control can be achieved for the image light L1 from the outside focused on the surface of the reflective liquid crystal display 25 and for the image light L2 formed on the surface of the reflective liquid crystal display 25 by the light source 21, as in Embodiment 1. These images can be observed through the eyepiece optical system 10.

Figure 4:
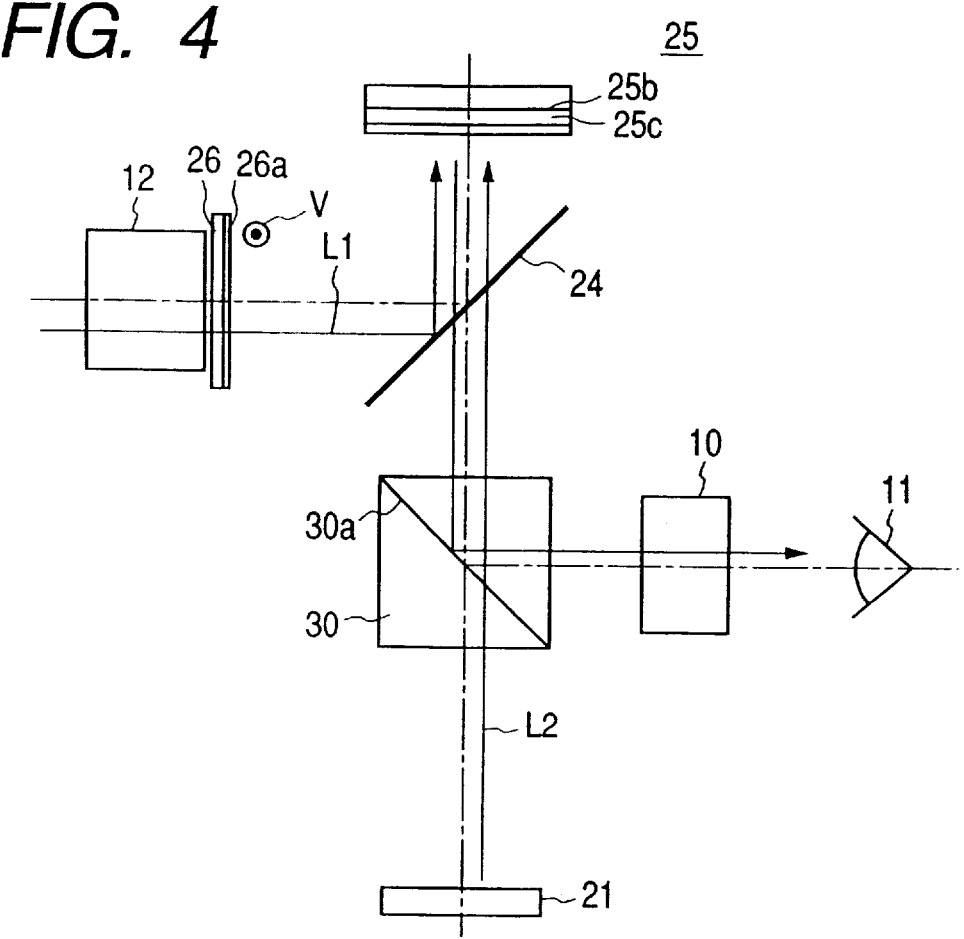
FIG. 4 is a side view to show the schematic structure associated with Embodiment 3 of the present invention.

FIG. 4 is a schematic diagram to show the main part of Embodiment 3 of the present invention. The present embodiment is arranged to cut and divide the image light from the outside and the image light corresponding to the image pattern formed on the display, based on the image information, by use of a polarization beam splitter 30.

The image light L1 from the outside is reflected by the half mirror 24 to be focused on the reflective surface 25b of the reflective liquid crystal display 25 by the imaging optical system 12, as in Embodiment 2. The image light L1 is light having the polarization component normal to the plane of the drawing because of the polarizing plate 26a of the liquid crystal shutter 26. When the reflective display 25 is in the off state, the polarization direction of the image light L1 is maintained even after it is reflected by the reflective surface 25b of the reflective display 25, as described previously. Therefore, this image light L1 passes through the half mirror 24 and thereafter is reflected by a surface 30a of the polarization beam splitter 30 to be projected onto the observer's eye 11 through the eyepiece optical system 10.

When the reflective liquid crystal display 25 is in the on state, the image light L1 is modulated as described previously to become light having the polarization direction parallel to the plane of the drawing after reflected. Therefore, the light travels through the surface 30a of the polarization beam splitter 30, so as not to be directed toward the observer's eye 11.

On the other hand, the light L2 from the light source 21 for display passes through the surface 30a of the polarization beam splitter 30 to become light having the polarization component parallel to the plane of the drawing and this light travels through the half mirror 24 to reach the reflective surface 25b of the reflective liquid crystal display 25. Since the polarization direction is maintained with the reflective liquid crystal display 25 being in the off state even after reflected, the light passes through the surface 30a of the polarization beam splitter 30, so as not to be directed to the observer's eye 11. When the reflective liquid crystal display is in the on state, the light is modulated to turn the polarization direction into the direction normal to the plane of the drawing after reflected. Therefore, the light is reflected by the surface 30a of the polarization beam splitter 30 toward the observer's eye 11.

The on/off operation control is carried out for each pixel of the reflective liquid crystal display 25, the shutter 26, and the light source 21, as described in Embodiment 2, based on the operation conditions of the reflective liquid crystal display 25 as described above, whereby the selective emission control can be achieved for the image light L1 from the outside focused on the surface of the reflective liquid crystal display 25 and for the image light L2 formed on the surface of the reflective liquid crystal display 25 by the light source 21, as in Embodiment 2.

Figure 5:
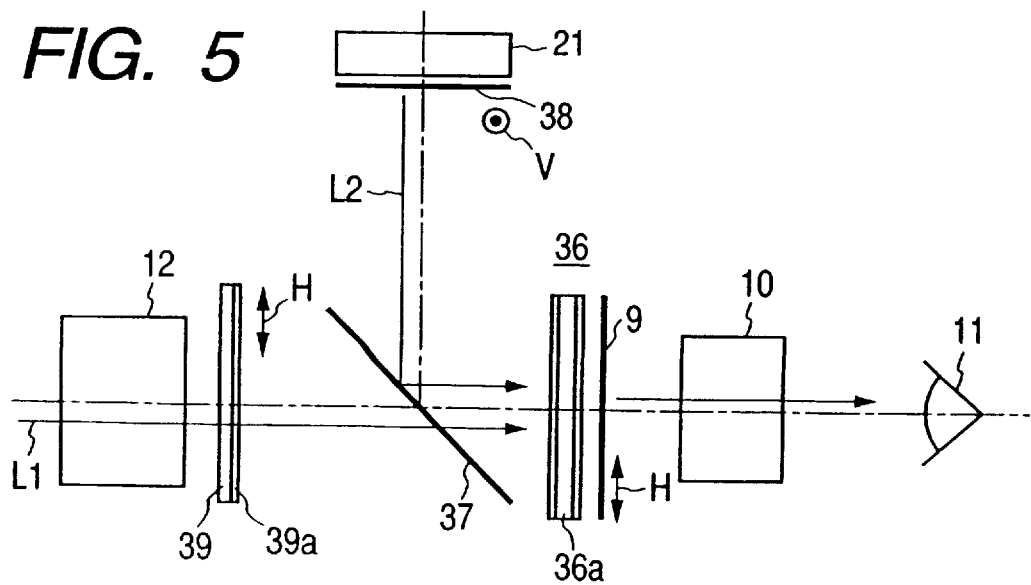
FIG. 5 is a side view to show the schematic structure associated with Embodiment 4 of the present invention.

FIG. 5 is a schematic diagram to show the main part of Embodiment 4 of the present invention. The present embodiment is arranged to use a transmission type liquid crystal display 36 instead of the reflective liquid crystal display described in Embodiments 2 and 3.

Here, numeral 39 designates a liquid crystal shutter having the same function as the liquid crystal shutter 26 of Embodiment 2, which is different from the liquid crystal shutter 26 only in that the direction of the polarization axis of the polarizing plate 39a is parallel to the plane of the drawing.

The image light L1 from the outside travels through the half mirror 37 to be focused on a liquid crystal element surface 36a of the transmissive liquid crystal display 36 by the imaging optical system 12. This image light L1 is light having the polarization component parallel to the plane of the drawing because of the polarizing plate 39a of the liquid crystal shutter 39 having the polarization axis parallel to the plane of the drawing.

Therefore, the light passes through the polarizing plate 9 having the polarization axis along the direction parallel to the plane of the drawing with the transmissive liquid crystal display 36 being in the on state, to be projected onto the observer's eye 11 through the eyepiece optical system 10. When the transmissive liquid crystal display 36 is in the off state, the light is polarized in the direction normal to the plane of the drawing to be intercepted by the polarizing plate 9, so that the light does not reach the observer's eye 11.

On the other hand, the light L2 from the illumination light source 21 is reflected by the half mirror 37 to be projected onto the surface of display 36. This light L2 is light having the polarization component normal to the plane of the drawing because of the polarizing plate 38 having the polarization axis along the direction normal to the plane of the drawing.

Therefore, the light L2 is intercepted by the polarizing plate 9 with the transmissive liquid crystal display 36 being in the on state, so as not to reach the observer's eye 11. Since with the liquid crystal display 36 being in the off state the polarization direction is changed into the direction parallel to the plane of the drawing, the light passes through the polarizing plate 9 to be projected onto the observer's eye through the eyepiece lens 10.

By carrying out the on/off operation of the liquid crystal element at arbitrary positions on the surface of the transmissive liquid crystal display with performing the scan operation pixel by pixel, the selective emission control can be achieved for the image light L1 from the outside focused on the surface of the transmissive liquid crystal display 36 and for the image light L2 corresponding to the image pattern formed on the surface of the transmissive liquid crystal display 36 by the light source 21 accordingly, as in the case of the embodiments described above.

In cases where an image with color information is reproduced on the transmissive liquid crystal display 36, the image can be formed by time-division operation to carry out the on/off control of the shutter 39 and the light source 21 at the same time as the on/off control of the pixels of the transmissive liquid crystal display, as described in Embodiment 2.

Figure 13:
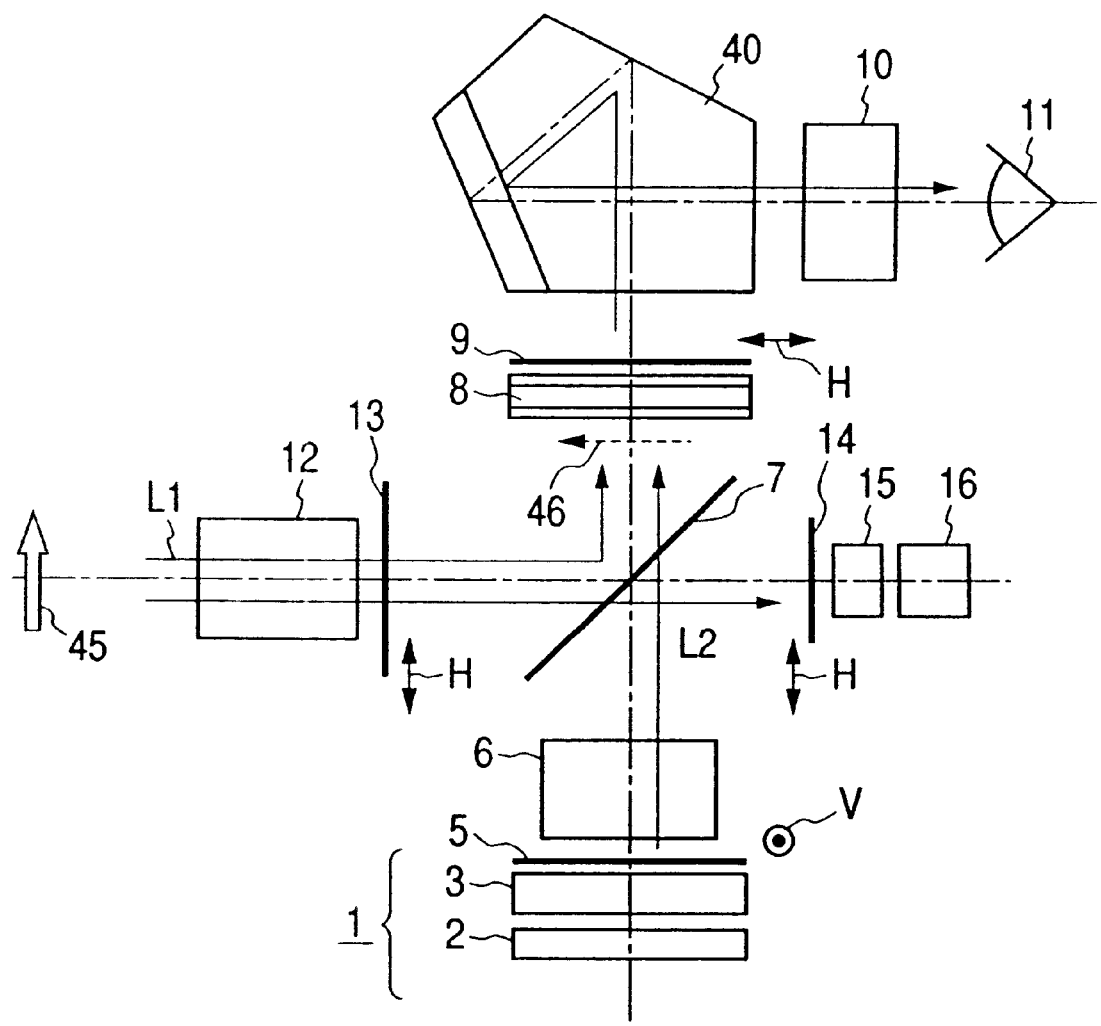
FIG. 13 is a schematic diagram to show the main part associated with Embodiment 5 of the present invention.

FIG. 13 is a diagram to show the schematic structure of Embodiment 5 according to the present invention. In the case of the optical systems used in the aforementioned embodiments, there is a possibility that the imaging optical system 12 becomes large in practice, because the image formed on the liquid crystal shutter surface 8 by the imaging optical system 12 needs to be an erect image.

The present embodiment thus uses a pentagonal roof prism 40 whereby the image focused on the liquid crystal shutter surface 8 by the imaging optical system 12 can be permitted to be an inverted image.

Namely, the object image 45 is focused as an inverted image 46 on the surface of the liquid crystal shutter 8, which is observed as an erect virtual image through the pentagonal roof prism 40 and the eyepiece optical system 10.

In each of the embodiments described above the magnification of the imaging lens 12 can be made variable, whereby the scene of the outside can also be observed as enlarged or reduced at an arbitrary magnification. At this time the magnification of the imaginary image displayed on the display 1 can also be varied in synchronism with the magnification of the imaging lens 12 at the same time.

Further, it is also possible to extend the visual function of the observer by using the image pickup device 16 with high sensitivity or the image pickup device 16 sensitive to special wavelengths such as infrared light, ultraviolet light, or the like and displaying image information obtained thereby on the display to supply visual information except for the vision of the observer.

Figure 14A:
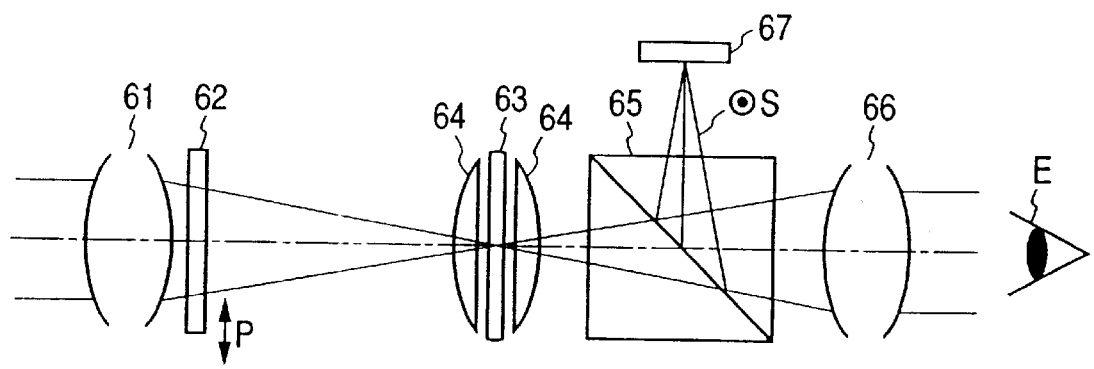
FIG. 14A and FIG. 14B are schematic diagrams to show the main part of Embodiment 6 of the present invention.

FIG. 14A is a schematic diagram to show the main part of Embodiment 6 of the present invention. The image observing apparatus of the present invention is comprised of an imaging optical system 61, a polarizing plate 62 which transmits only linearly polarized light having the polarization direction parallel to the plane of the drawing (which will be referred to hereinafter as p-polarized light), a spatial modulator 63 having the two-dimensional pixel structure, field lenses 64, a polarization beam splitter 65 which transmits the p-polarized light but reflects linearly polarized light having the polarization direction normal to the plane of the drawing (which will be referred to hereinafter as s-polarized light), an eyepiece optical system 66, and a display unit 67 for emitting a beam including s-polarized light, which is composed of a back light, a liquid crystal element, a polarizing plate, and so on.

Figure 14B:
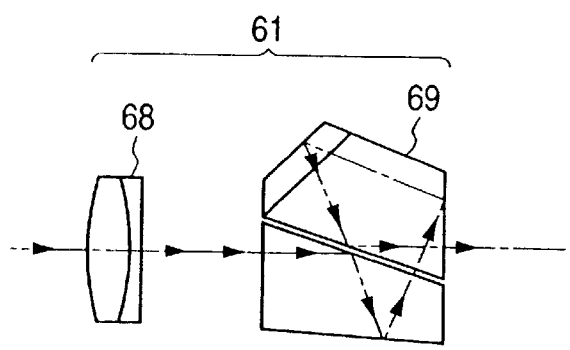

In the figure letter E represents the eye of the observer. The imaging optical system 61 is composed, for example, of imaging lens 68 and prism 69, as illustrated in FIG. 14B, and focuses the image of the outside as an erect real image on the spatial modulator 63.

The spatial modulator 63 is constructed of a liquid crystal panel etc. and has the function capable of rotating the polarization direction of incident light for every pixel. Since the imaging optical system 61 and eyepiece optical system 66 are set to have the same focal length, the outside can be observed at the magnification of 1. The s-polarized light component among the light from the display unit 67 is reflected by the polarization beam splitter 65 to be guided to the observing eye E by the eyepiece optical system 66. The light from the outside travels through the polarizing plate 62 with being converged by the imaging optical system 61 to become the p-polarized light to be focused on the spatial modulator 63.

The beam of the p-polarized light component having passed through the spatial modulator 63 travels through the polarization beam splitter 65 to be guided to the observing eye E by the eyepiece optical system 66.

On the other hand, the beam of the s-polarized light component, resulting from rotation of the polarization plane during passage through the spatial modulator 63, is reflected by the polarization beam splitter 65, so as not to reach the observing eye E. Each place (field angle) of the outside field can be switched precisely between visible and invisible by controlling the polarization direction of the outgoing light for every pixel of the spatial modulator as described above.

Further, the display panel of the display unit 67 and the spatial modulator 63 are located at optically equivalent positions with respect to the eyepiece optical system 66. Because of this arrangement, the display panel of the display unit 67 and the spatial modulator 63 are imaged as virtual images at the same magnification at the same position.

By properly setting the pixel structures of the display panel of the display unit 67 and the spatial modulator 63, each pixel of the spatial modulator 63, i.e., each place (field angle) of the outside field can be switched between visible and invisible precisely corresponding to each pixel of the display panel of the display unit 67.

Provision of the field lenses 64 permits the light from the outside to be incident to the spatial modulator 63 on a telecentric basis and also permits the size of each optical system to be made smaller by moving the position of the entrance pupil to an appropriate position.

Figure 15A:
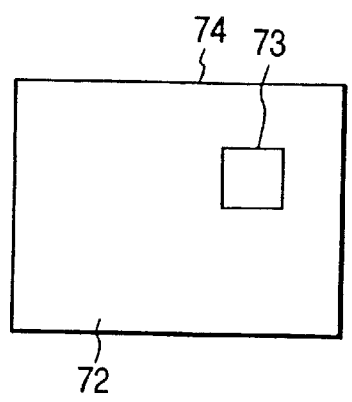
FIG. 15A and FIG. 15B are explanatory diagrams to illustrate the observation area of FIG. 14A.

In this structure, the imaginary image produced by computer graphics or the like in an image generating device not illustrated is displayed on the display unit 67 and the light from the outside is intercepted by rotating the polarization direction of the light incident to the pixels on the spatial modulator 63 corresponding to the display area of the imaginary image by 90°, so as to intercept the light from the outside, whereby a display image 73 can be observed without being seen through, as being superimposed on a scene 72 of the outside in the observation area 74, as illustrated in FIG. 15A.

Since the light from the outside is intercepted in the portion corresponding to the display image 73, a display of "black color" can also be displayed, which was impossible heretofore. Since the scene 72 of the outside is an optically obtained image different from the image once electronically converted through the video camera or the like, it can be observed as an image having the quality almost equivalent to that where the actual scene is observed directly as in the case of the observation through binoculars or the like.

Further, it is also possible to present a see-through image on purpose by setting the angle of rotation of the polarization direction of the beam incident to the pixels on the spatial modulator 63 corresponding to the display area 73 to an arbitrary angle instead of 90°.

Figure 16:
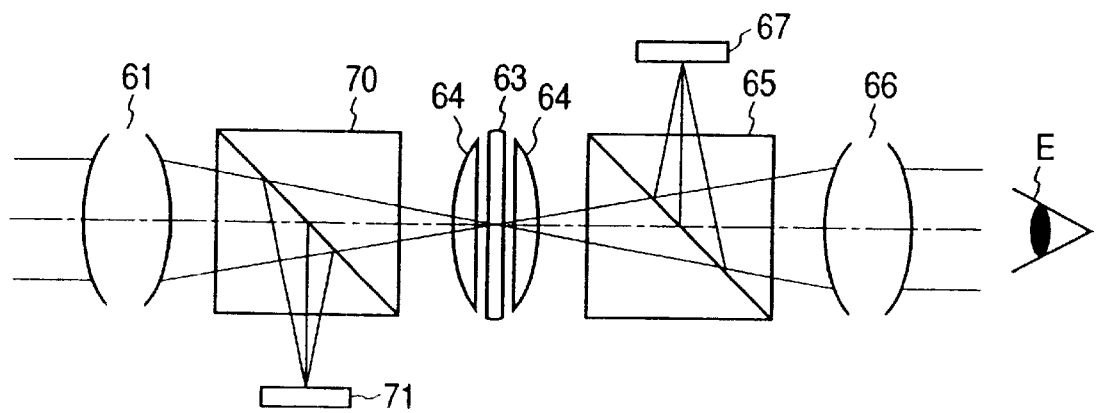
FIG. 16 is a schematic diagram of a modification obtained by modifying part of FIG. 14A.

It is also possible to employ a configuration capable of acquiring the information of the outside by providing a polarization beam splitter 70 for transmitting the p-polarized light but reflecting the s-polarized light and a two-dimensional image pickup device 71 such as a CCD panel, as illustrated in FIG. 16.

The light from the outside is converged by the imaging optical system 61, and the p-polarized light component of the converging beam is transmitted by the polarization beam splitter 70 to pass through each element to be guided to the side of the observing eye E while the s-polarized component is reflected thereby to form an outside image on the image pickup device 71.

Figure 15B:
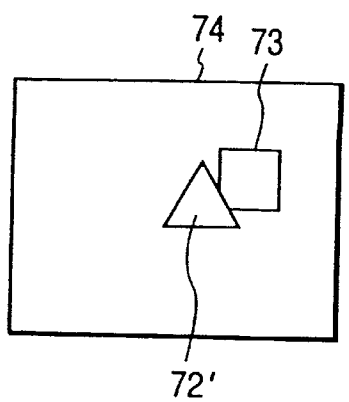

This structure permits the display taking account of the positional relation between the display image (imaginary image) 73 and a real object 72' in the observation area 74, as illustrated in FIG. 15B, by computing the positional relation between the imaginary image and the real object superimposed on the scene of the outside, based on the information from the image pickup device 71, and controlling the display unit 67 and spatial modulator 63, based thereon. Further, the three-dimensional image can be observed more naturally by providing the present observing devices for the left and right eyes and controlling the display units 67 and spatial modulators 63 with consideration to a binocular disparity amount and the like.

Figure 17:
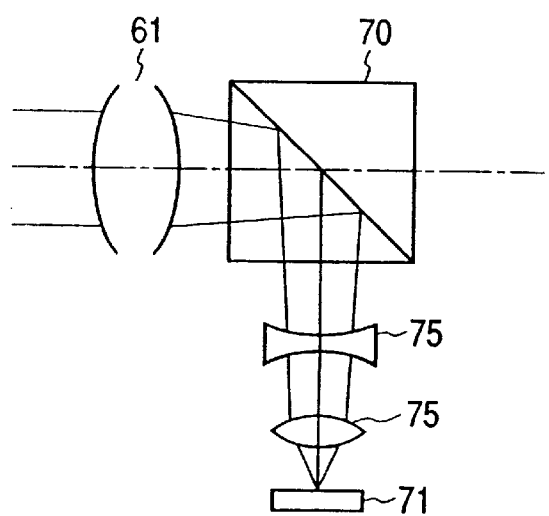
FIG. 17 is a schematic diagram of a modification obtained by modifying part of FIG. 14A.
Figure 18:
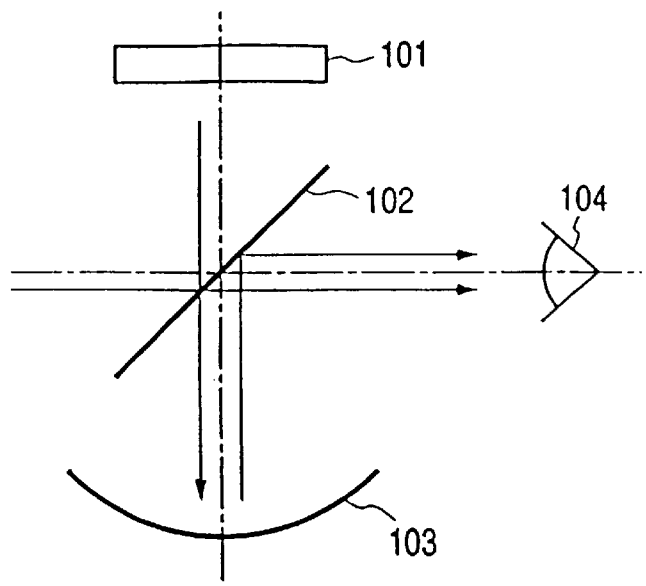
FIG. 18 is a side view to show the schematic structure of the conventional apparatus.
Figure 19:
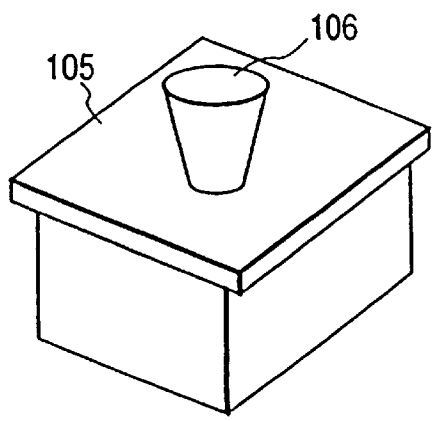
FIG. 19 is an explanatory diagram to show the synthesis of a real object image and an imaginary image.

It is also possible to provide freedom for selection of the sizes of the spatial modulator 63 and the image pickup device 71 etc. by providing a zooming optical system 75 between the polarization beam splitter 70 and the image pickup device 71 to permit change of imaging magnifications onto the spatial modulator 63 and onto the image pickup device 71, as illustrated in FIG. 17.

In the above embodiment the imaging optical system 61 and the eyepiece optical system 66 have the same focal length, but it is also possible to employ a configuration in which the focal length of at least either one of the optical systems is variable or a configuration to enable magnifying and demagnifying observation by making the positions of the optical systems variable.

It is also allowed to employ a configuration in which a half mirror is provided as optical path splitting means instead of the polarization beam splitter 65 and in which a polarizing plate that transmits the p-polarized light is disposed immediately before the half mirror, in the structure of FIG. 14A and FIG. 16.

It is also allowed to employ a configuration in which a half mirror is provided as optical path splitting means instead of the polarization beam splitter 70 and in which a polarizing plate that transmits the p-polarized light is disposed immediately after the half mirror, in the structure of FIG. 16.

In the above embodiment the transmissive liquid crystal panel was used as a display element of the display unit 67, but the display element can also be constructed of a reflective liquid crystal panel, an EL panel, or the like.

Figure 20:
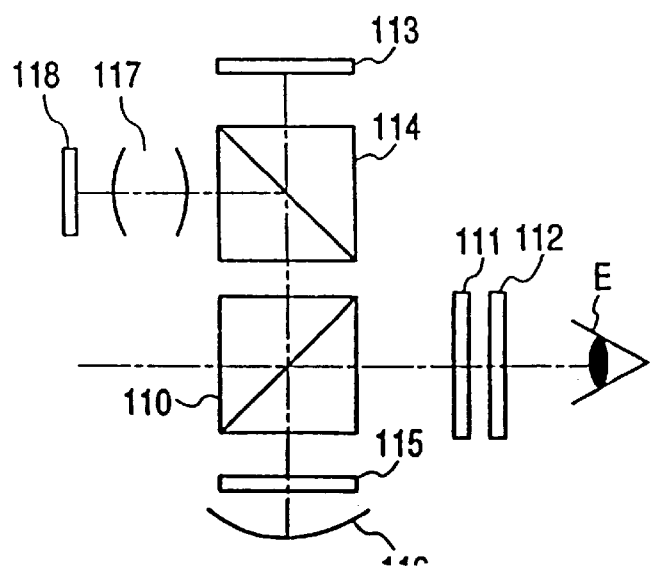
FIG. 20 is a schematic diagram to show the main part associated with Embodiment 7 of the present invention.

FIG. 20 is a schematic diagram to show the main part of Embodiment 7 of the present invention. The image observing apparatus according to the present invention is composed of a polarization beam splitter 110 which transmits the p-polarized light but reflects the s-polarized light, a spatial modulator 111 having the two-dimensional pixel structure, a polarizing plate 112 located so as to transmit the p-polarized light, a display unit 113 which emits the p-polarized light, composed of a back light, a liquid crystal element, a polarizing plate, etc., a polarization beam splitter 114 which transmits the p-polarized light but reflects the s-polarized light, a quarter wave plate 115, a mirror 116 having a positive power, an image pickup optical system 117, and a two-dimensional image pickup device 118 such as the CCD panel or the like. In the figure letter E represents the eye of the observer. The spatial modulator 111 is comprised, for example, of a transmission type TN liquid crystal panel or the like, which has the function to preserve the polarization direction of incident light during the on operation and to rotate the polarization direction of incident light 90° during the off operation in each pixel. The focal length and position of the mirror 116 are determined so that an image of the display surface of the display unit 113 is presented as an enlarged virtual image, for example, at the position 2 m ahead of the observer.

Among the light from the outside, the p-polarized light component travels through the polarization beam splitter 110. to be guided to the spatial modulator 111. The beam of the p-polarized light component travels through the spatial modulator 111 in areas in the on state of the spatial modulator 111 and the beam then passes through the polarizing plate 112 to be guided to the observing eye E. In this case the light does not pass through any optical system having a power and, therefore, the observer can observe the outside naturally as in the case of the observer looking over the glass window. On the other hand, in areas in the off state of the spatial modulator 111, the beam of the s-polarized light component resulting from rotation of the polarization plane during passage through the spatial modulator 111 is intercepted by the polarizing plate 112, so as not to reach the observing eye E. Among the light from the outside, the s-polarized light component is reflected by the polarization beam splitters 110 and 114 to be converged by the image pickup optical system 117 to form an outside image on the image pickup device 118.

Since the display image light emitted from the display unit 113 is the p-polarized light, it travels through the polarizing beam splitters 114, 110 and through the quarter wave plate 115 and then is reflected by the mirror 116 to travel again through the quarter wave plate 115. At this time the light passes through the quarter wave plate twice and thus the polarization plane of the light is so rotated as to turn the display image light into the s-polarized light. Since the light passing through the quarter wave plate 115 is the s-polarized light, it is reflected by the polarization beam splitter 110 to be guided to the spatial modulator 111. In the areas in the on state of the spatial modulator 111, the beam of the s-polarized light component having passed through the spatial modulator 111 is intercepted by the polarizing plate 112, so as not to reach the observing eye E. On the other hand, in the areas in the off state of the spatial modulator 111, the beam of the p-polarized light component resulting from rotation of the polarization plane during passage through the spatial modulator 111 travels through the polarizing plate 112 to be guided to the observing eye E.

Figure 21A:
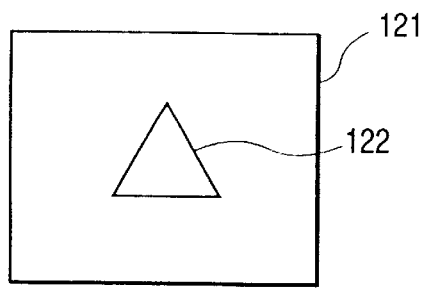
FIG. 21A, FIG. 21B, and FIG. 21C are explanatory diagrams to show the synthesis of a real image and an imaginary image.
Figure 21B:
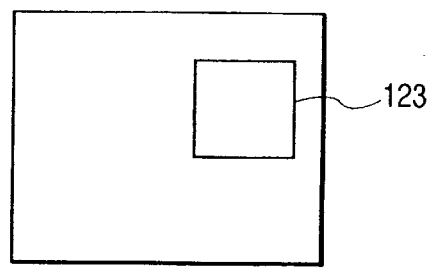
Figure 21C:
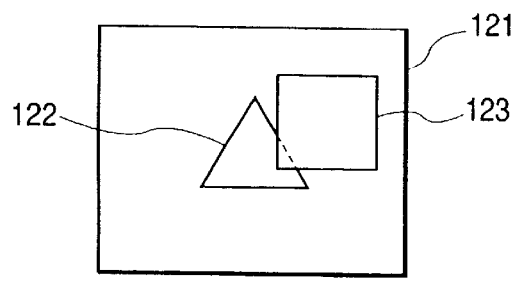
Figure 22:
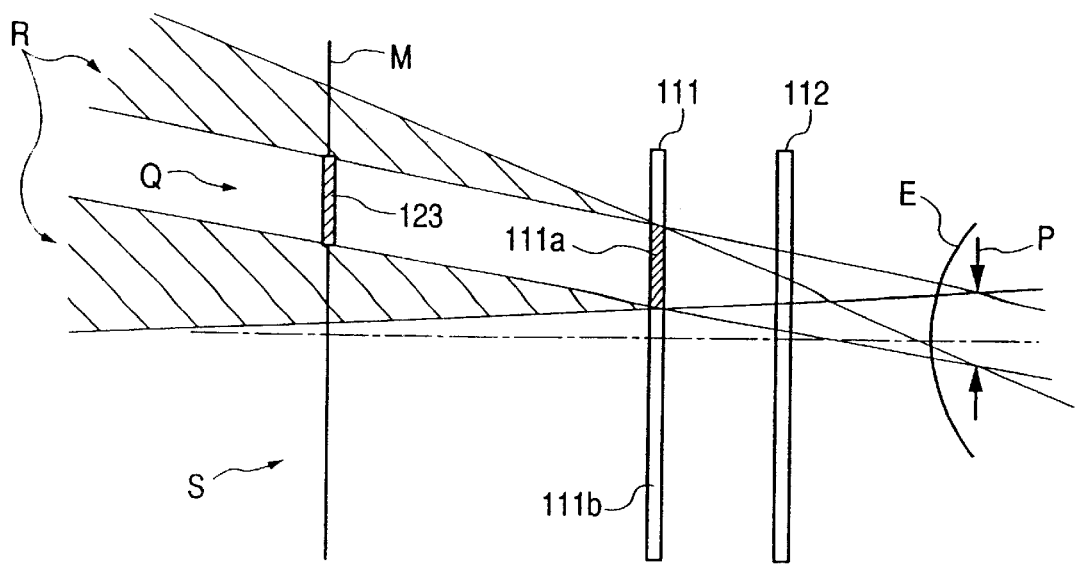
FIG. 22 is an explanatory diagram to illustrate a shield area interrupted by a spatial modulator in the present invention.

The effect of the present embodiment will be described next. For example, suppose an object 122 is present in the real space and an outside observation image at that time is as illustrated in FIG. 21A. Numeral 121 represents the observation area. Supposing an imaginary object (display image) 123 is displayed as superimposed over the real object 122 (the display image is illustrated in FIG. 21B), in the case of the conventional image observing apparatus, the display image is a virtual image and the real image 122 is seen through the imaginary object 123 in the overlapping portion, as illustrated in FIG. 21C. Then, as illustrated in FIG. 22, the area where the beam forming the imaginary object (display image) passes is kept in the off state 111a and the other area in the on state 111b on the spatial modulator 111. FIG. 22 is an enlarged view of the part from the spatial modulator 111 to the observing eye E in the present embodiment illustrated in FIG. 20. Letter P indicates the entrance pupil of the observing eye E. The position and size of the area kept off on the spatial modulator 111 are determined based on the position and size of the imaginary object 123, the size of the entrance pupil P of the observing eye E, the position of the spatial modulator 111, eye rotation, the binocular disparity amount in the case of the display of the three-dimensional image, and so on. In this structure the light from the outside is the p-polarized light and thus passes through the polarizing plate 112 in the portion of 111b in the on state, but the beam in the portion of 111a in the off state is the s-polarized light and is thus intercepted by the polarizing plate 112. On the other hand, the light from the display unit 113 is the s-polarized light at the entrance of the spatial modulator 111 and the light in the portion of 111b is intercepted by the polarizing plate 112. Therefore, the light in the portion of 111a travels through the polarizing plate 112. Therefore, the light from the outside in the portion of region Q does not reach the observing eye but in the area S the light travels through the portion 111b in the on state of the spatial modulator 111 to be observed without an eclipse.

Figure 23A:
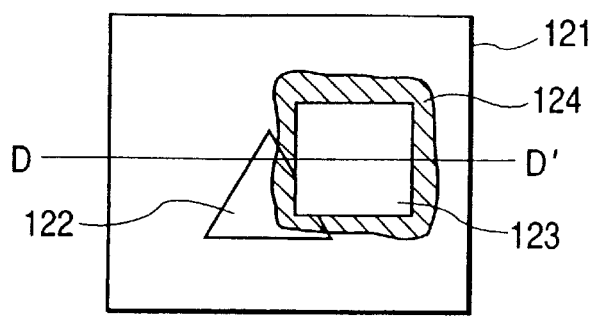
FIG. 23A, FIG. 23B, FIG. 23C, and FIG. 23D are explanatory diagrams to illustrate the synthesis of a real image and an imaginary image.
Figure 23B:
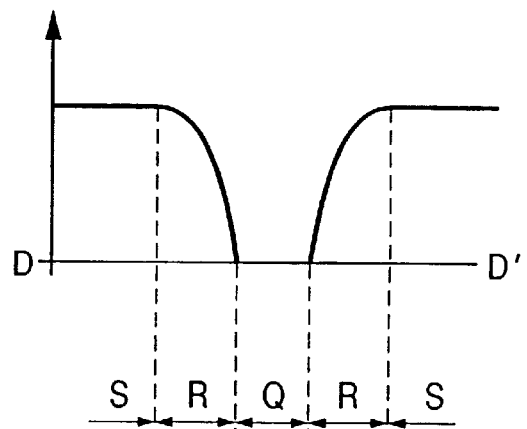
Figure 23C:
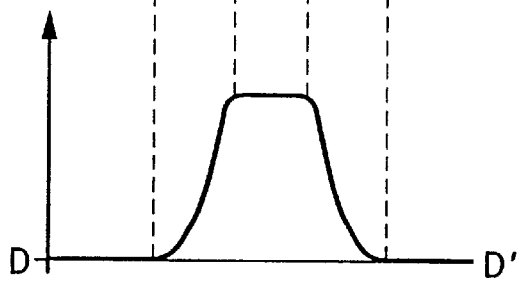
Figure 23D:
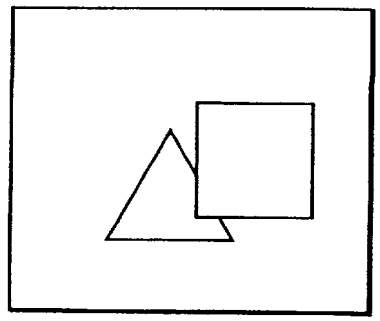

There, however, exists a partly eclipsed region R around the region Q where the light from the outside is intercepted completely, because the virtual image M of the display panel of the display unit 113 is not located at an optically equivalent position to the spatial modulator 111 and the entrance pupil P has some size, as illustrated in FIG. 22. An observed image at this time is as illustrated in FIG. 23A, in which a dark area 124 appears around the imaginary object 123. Transmittance profiles of the outside light and the display light on a line D–D' on the observation area 121 in FIG. 23A are illustrated in FIG. 23B and FIG. 23C, respectively. Thus, the outside image received by the image pickup device 118 is combined with the imaginary image produced by computer graphics or the like, so that the image as illustrated in FIG. 23D is displayed on the display unit 113. In this method, the scene of the outside partly eclipsed by the spatial modulator 111 and polarizing plate 112 in the portion around the imaginary image 123 is complemented by the outside image received by the image pickup device 118 and displayed on the display unit 113, so that the image can be observed without a sense of incompatibility. Although the quality is a little degraded than in the case of direct observation of the real scene, the image has considerably high quality, because the image directly observed is overlapped on the image once electronically converted. The observer can observe the outside directly in the most of the observation area.

A control unit not illustrated combines the outside image received by the image pickup device 118 with the imaginary image produced by computer graphics or the like to display a combined image on the display unit 113 and performs an arithmetic operation based on the parameters described above to determine the on/off areas and control the spatial modulator 111 based thereon, whereby the observer can observe the both of the display image and the outside image in good order.

Since the outside beam can be intercepted by controlling the spatial modulator 111, the "black color" can also be displayed as superimposed on the outside image.

In this structure the outside image does not have to be formed on the spatial modulator and thus the imaging optical system can be excluded, which can decrease the size of the apparatus greatly.

The above embodiment showed the example in which the operation states of the spatial modulator 111 were two, on and off, but the apparatus can also be modified to employ an intermediate state in which the angle of rotation of the polarization direction of the incident light is not 90° but an arbitrary angle, so as to present an image that is see-through to an arbitrary extent.

Figure 24A:
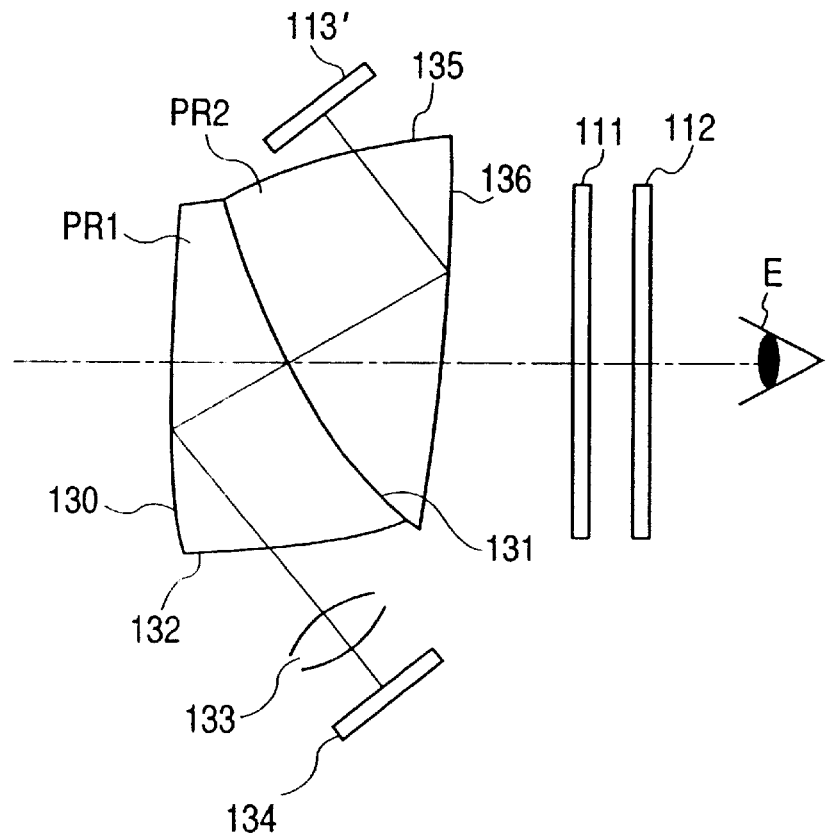
FIG. 24A and FIG. 24B are schematic diagrams to show respective modifications obtained by modifying part of FIG. 20.
Figure 24B:
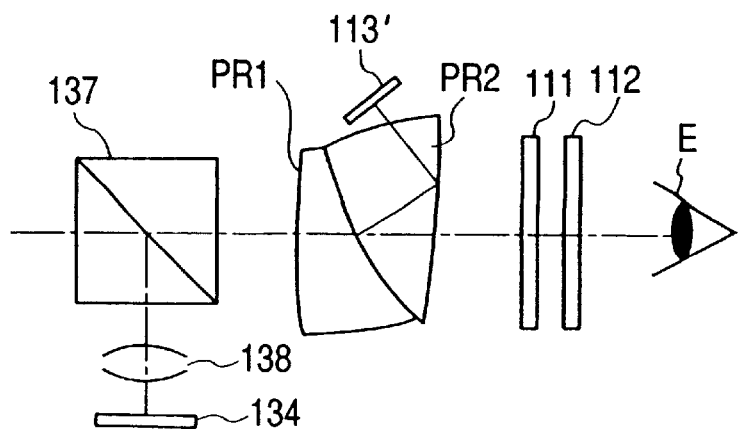

Modifications of the present embodiment according to the present invention are illustrated in FIG. 24A and FIG. 24B. The elements having the same functions as those in the embodiment illustrated in FIG. 20 are denoted by the same reference symbols and the description thereof will be omitted herein.

In FIG. 24A an optical thin coating having such polarization selectivity as to transmit the p-polarized light but reflect the s-polarized light is formed at an interface 131 between prism bodies PR1, PR2. The prism bodies PR1 and PR2 are made of a material having no birefringence.

The beam of s-polarized light emitted from the display unit 113' is incident to the prism body PR2 with being refracted by a surface 135 thereof, then is incident at an angle over the critical angle to a surface 136 to be totally reflected thereby, is reflected by the surface 131 having a positive power because it is the s-polarized light, is again incident at an angle below the critical angle to the surface 136 to be refracted thereby, and is emergent from the prism body PR2 to be guided to the spatial modulator 111. The surfaces 131, 135, 136 have their respective optical powers and form an enlarged virtual image of the display unit 113'. Each of the surfaces 131, 135, 136 is made as a rotationally asymmetric, aspherical surface having powers differing depending upon azimuths about the vertex of each surface, whereby various aberrations caused by decentering of the optical system can be corrected by the small number of optical elements. Among the light from the outside, the p-polarized light component is incident to the prism body PR1 with being refracted by a surface 130, is transmitted by the surface 131, is incident to the surface 136 to be refracted thereby, and is emergent from the prism body PR2 to be guided to the spatial modulator 111. The prism bodies PR1, PR2 are made of respective materials having the same index of refraction and the shapes of the surface 130 and surface 136 are optimized, whereby they are arranged to have no power with respect to the light from the outside. On the other hand, the s-polarized light component is reflected by the surface 131 having a negative power, is again incident at an angle over the critical angle to the surface 130 having a positive power to be totally reflected thereby, is refracted by the surface 132 to be emergent from the prism body PR1, and is then converged by a lens unit 133 having a positive power to form an outside image on the image pickup device 134. Each of the surfaces 130 and 132 is made as a rotationally asymmetric, aspherical surface having powers differing depending upon azimuths about the vertex of each surface.

The modification illustrated in FIG. 24B is constructed substantially in the same structure as the modification illustrated in FIG. 24A except that the part of the image pickup system composed of the prism body PR1, the lens unit 133, and the image pickup device 134 of the modification illustrated in FIG. 24A is replaced by that composed of a polarization beam splitter 137, an image pickup optical system 138, and the image pickup device 134.

The both modifications illustrated in FIG. 24A and FIG. 24B can also achieve superposition of the real scene and the imaginary image according to the same principle as in the embodiment illustrated in FIG. 20.

Figure 25:
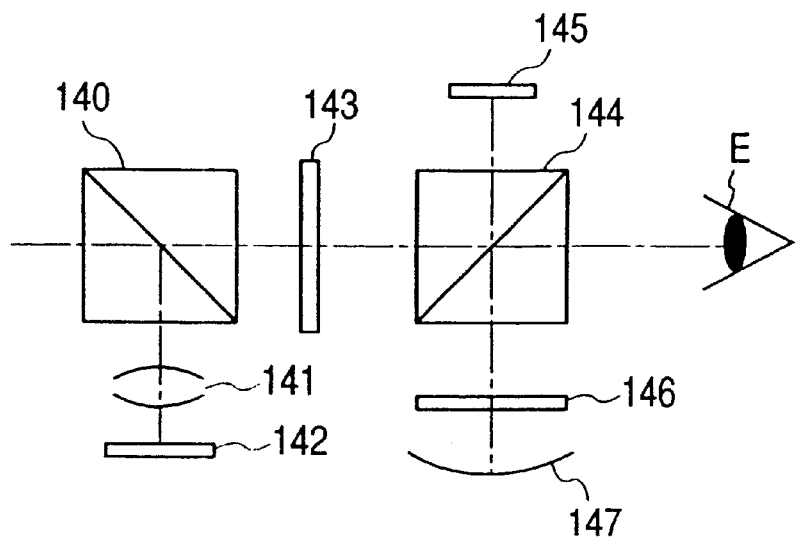
FIG. 25 is a schematic diagram to show the main part associated with Embodiment 8 of the present invention.

FIG. 25 is a schematic diagram to show the main part of the eighth embodiment. The image observing apparatus according to the present invention is composed of a polarization beam splitter 140 that transmits the p-polarized light but reflects the s-polarized light, a spatial modulator 143 having the two-dimensional pixel structure, a display unit 145 for emitting the p-polarized light, composed of a back light, a liquid crystal element, a polarizing plate, etc., a polarization beam splitter 144 that transmits the p-polarized light but reflects the s-polarized light, a quarter wave plate 146, a mirror 147 having a positive power, an image pickup optical system 141, and a two-dimensional image pickup device 142 such as the CCD panel or the like. In the figure letter E represents the eye of the observer. The spatial modulator 143 is constructed of a liquid crystal panel or the like and has the function to preserve the polarization direction of incident light during the on operation and to rotate the polarization direction of incident light 90° during the off operation in each pixel. The focal length and position of the mirror 147 are determined so that an image of the display surface of the display unit 145 is presented as an enlarged virtual image, for example, at the position 2 m ahead of the observer.

Among the light from the outside, the p-polarized light component travels through the polarization beam splitter 140 to be guided to the spatial modulator 143. The beam of the p-polarized light component having passed through the spatial modulator 143 travels through the polarization beam splitter 144 to be guided to the observing eye E. Since in this case the light does not pass through any optical system having a power or the like, the observer can observe the outside naturally as in the case where the observer observes the outside over the glass window. On the other hand, the beam of the s-polarized light component resulting from rotation of the polarization plane during passage through the spatial modulator 143 is reflected by the polarization beam splitter 144, so as not to reach the observing eye E. Among the light from the outside, the s-polarized light component is reflected by the polarization beam splitter 140 and is converged by the image pickup optical system 141 to form an outside image on the image pickup device 142.

Since the display image light emitted from the display unit 145 is the p-polarized light, it travels through the polarization beam splitter 144 and through the quarter wave plate 146, is then reflected by the mirror 147, and again travels through the quarter wave plate 146. At this time the light travels through the quarter wave plate twice and thus the polarization plane is rotated, so that the display image light becomes the s-polarized light. Since the beam transmitted by the quarter wave plate 146 is the s-polarized light, it is reflected by the polarization beam splitter 144 to be guided to the observing eye E.

Figure 26A:
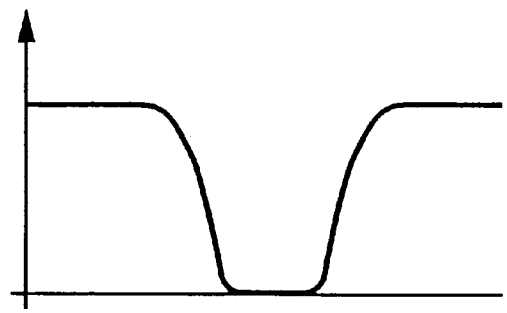
FIG. 26A and FIG. 26B are diagrams to show light amount profiles of an outside beam and a display beam according to the present invention.
Figure 26B:
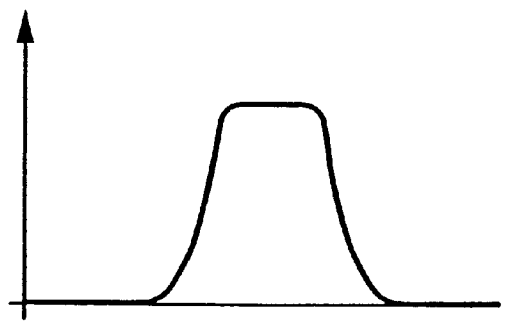

The light from the outside can be intercepted in an arbitrary area by controlling the spatial modulator 143 according to the principle as illustrated in FIG. 22. On the other hand, the display unit 145 is arranged to display an image having a light amount profile as illustrated in FIG. 26B so as to complement the transmittance profile of the outside light illustrated in FIG. 26A. This structure can accomplish the same effect as in Embodiment 7. Since this structure permits the spatial modulator to be located at the position apart from the pupil of the observing eye, the influence of eclipse can be decreased in the area around the shield region.

Figure 27A:
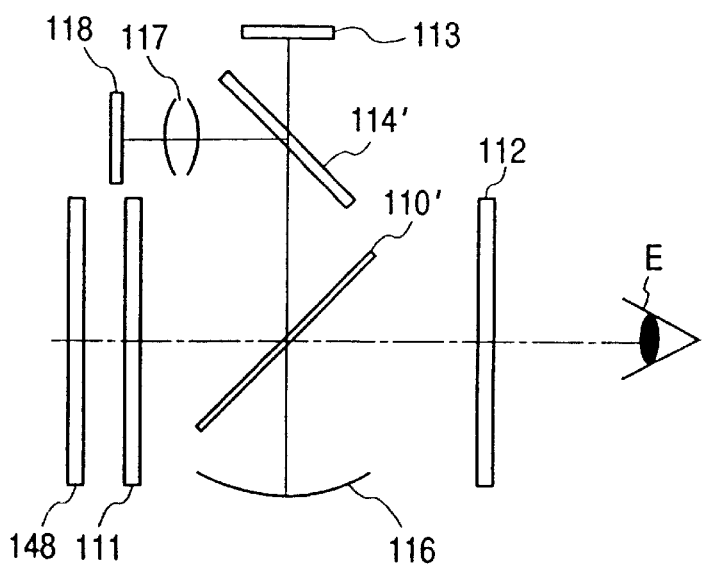
FIG. 27A, FIG. 27B, and FIG. 27C are schematic diagrams to show respective modifications obtained by modifying part of FIG. 20, FIG. 24A, and FIG. 24B.
Figure 27B:
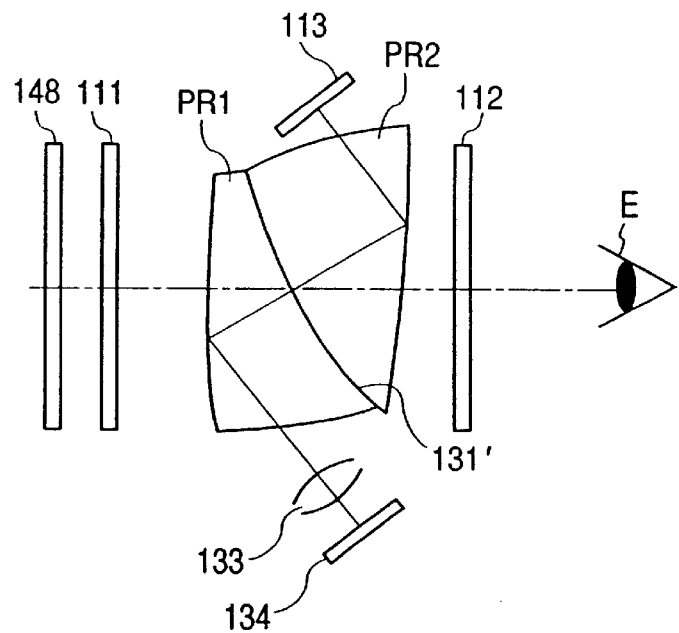
Figure 27C:
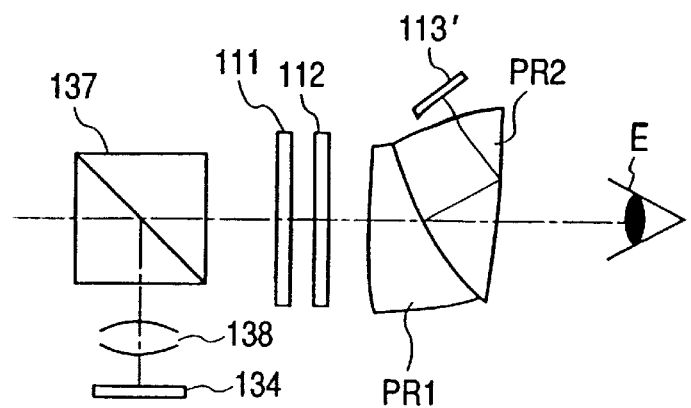

Other modifications of the present invention are illustrated in FIG. 27A to FIG. 27C. In FIG. 27A to FIG. 27C, the elements having the same functions as in the embodiment and modifications illustrated in FIGS. 20, 24A, and 24B are denoted by the same reference symbols and the description thereof will be omitted herein.

The modification of FIG. 27A is constructed substantially in the same structure as the embodiment illustrated in FIG. 20 except that the polarization beam splitters 110, 114 of the embodiment illustrated in FIG. 20 are replaced by half mirrors 110', 114', respectively, the quarter wave plate 115 is excluded and instead a polarizing plate 148 displaced so as to transmit the p-polarized light is added, and the spatial modulator 111 is located on the outside of the half mirror 110'.

The modification of FIG. 27B is constructed substantially in the same structure as the modification illustrated in FIG. 24A except that the display unit 113' to emit the s-polarized light in the modification illustrated in FIG. 24A is replaced by the display unit 113 to emit the p-polarized light, the prism interface 131 is replaced by a half mirror 131', a polarizing plate 148 disposed so as to transmit the p-polarized light is added, and the spatial modulator 111 is located on the outside of the prism body PR1.

The modification of FIG. 27C is constructed substantially in the same structure as the modification illustrated in FIG. 24B except that the prism interface 131 of the embodiment illustrated in FIG. 24B is replaced by a half mirror 131' and the spatial modulator 111 and polarizing plate 112 are located on the outside of the prism body PR1.

These configurations can also achieve the same effect when the same control is carried out as in Embodiment 8 illustrated in FIG. 25.

Figure 28A:
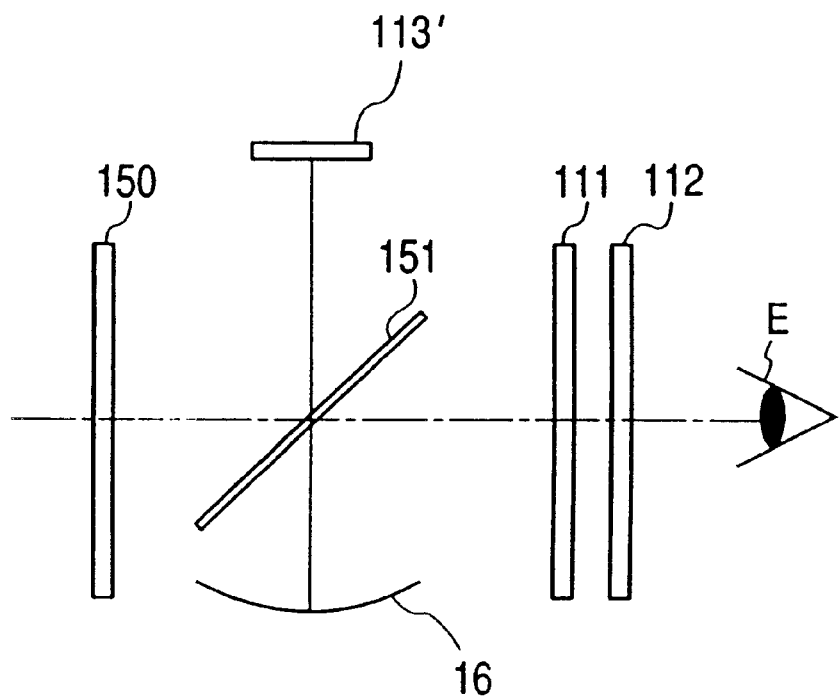
FIG. 28A and FIG. 28B are a schematic diagram to show the main part associated with Embodiment 9 of the present invention and an explanatory diagram to illustrate the observation area thereof.
Figure 28B:
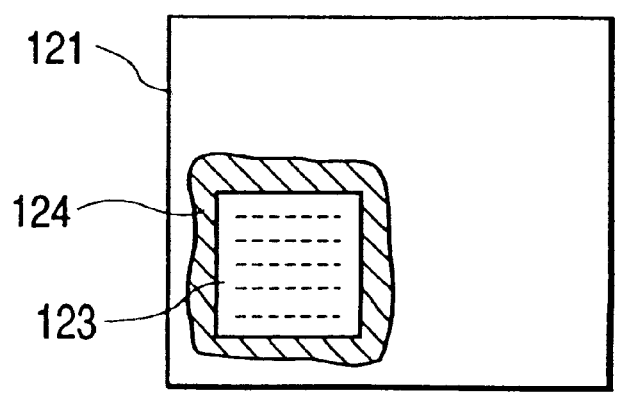

FIG. 28A is a schematic diagram to show the main part of the ninth embodiment. The structure as illustrated in FIG. 28A can also be employed in cases where the image presented in the observation space is one requiring no consideration to the positional relation in the depth direction with the real object as illustrated in FIG. 28B, for example, where a computer screen or the like is presented. The elements having the same functions as in the embodiment illustrated in FIG. 20, are denoted,by the same reference symbols and the description thereof is omitted herein. Among the light from the outside the p-polarized light component travels through the polarizing plate 150 disposed so as to transmit the p-polarized light, and then is transmitted by the half mirror 151 to be guided to the spatial modulator 111. The display light emitted from the display unit 113' for emitting the s-polarized light, composed of the back light, the liquid crystal element, the polarizing plate, etc., is transmitted by the half mirror 151, is reflected by the mirror 116, and is reflected by the half mirror 151 to be guided to the spatial modulator 111. This structure permits the observer to observe the display image 123 in the observation area 121 without seeing through the display image, as illustrated in FIG. 28B, according to the aforementioned principle. In this case, a dark portion also appears around the display image as in the case illustrated in FIG. 23A, but the computer screen can be displayed at an arbitrary position in the field so as to prevent the outside from being seen through.

The above embodiments employed the transmission type liquid crystal panel as a display element of the display unit 113, 113', but the display element can also be constructed using the reflective liquid crystal panel, the EL panel, or the like.

As detailed above, the present invention can accomplish the image observing apparatus that can accurately intercept the outside information from the outside to the background part of the image (display image) displayed on the display (image display means) in correspondence to the display image, so as to facilitate observation of both the display image and the outside image or the image observing apparatus that can prevent the imaginary image from becoming a see-through image when the imaginary image (display image) produced by computer graphics or the like is superimposed on the scene (outside information) in the real space, so as to permit good observation of both the images. In addition, the present invention can also accomplish the image observing apparatus that can display the "black color."

Particularly, the present invention permits the image light from the outside to be removed in pixel units in the image overlapping area where the image from the display is displayed as superimposed on the image light from the outside. This can prevent the image of letters, images, etc. displayed on the display from becoming harder to view at the place where the light from the outside is strong, for example outdoor. The present invention can also prevent the imaginary image from being seen through when the imaginary image displayed on the display is presented as combined with the scene of the outside, i.e., the real image.

Further, it is also possible to make the imaginary image see-through as before, by carrying out the operation control of the liquid crystal shutter so as to alternately switch between the scene of the outside and the display image from the display. The observer's area of view is determined by the size of the liquid crystal shutter surface on which the scene of the outside and the image of the display are formed. This means that the area of view is determined only by the apparatus independently of the positions of the apparatus and the observer's eye. If this area of view is picked up by the image pickup device such as the CCD camera or the like and the position of the image to be displayed on the display is determined based on the image information, accurate synthesis will be able to be achieved as in the case where the image produced by computer graphics or the like is synthesized with the real scene picked up by the CCD camera or the like.

The present invention can also achieve the extension of the visual function of the observer to present visual information more than that observed by the observer, by employing the configuration to make the magnification of the imaging optical system 12 variable so as to permit observation of magnified or demagnified image of the outside scene at an arbitrary magnification or the configuration using the image pickup device 16 with high sensitivity or the image pickup device sensitive to the special wavelengths such as the infrared light, the ultraviolet light, or the like and displaying the image information obtained thereby on the display.

The seventh and eighth embodiments of the present invention can also provide the more compact apparatus with the same effect without using the imaging optical system for imaging the outside image on the spatial modulator surface, by complementing the eclipsed area around the shield region of the outside with the outside information picked up by the image pickup device.

What is claimed is:

1. An image observing apparatus in which a light beam from outside and a light beam from display means are guided to an eye of an observer via optical path combining means to observe, in the same view field, outside image information based on the beam from outside and a display image displayed on the display means, said image observing apparatus comprising image pickup means for picking up outside image information and a spatial modulator having a two-dimensional pixel structure, said image observing apparatus further comprising control means for causing the spatial modulator to modulate at least a partial area thereof so as to permit switching of observation between the beam composing said display image, for controlling said spatial modulator so as to intercept or reduce the beam in an area of said outside image information in accordance with an area of said display image, and for complementing an area of said outside image information, eclipsed by said spatial modulator, around said area of the display image with the image information picked up by said image pickup means.

2. The image observing apparatus according to claim 1, wherein the beam composing the outside image information and the beam composing said display image are beams having respective polarization states different from each other, and said spatial modulator comprises a transmission type liquid crystal panel.

3. An image observing system comprising a pair of image observing apparatuses as defined in claim 2, for a right eye and a left eye of an observer.

4. An image observing system comprising a pair of image observing apparatuses as defined in claim 1 for a right eye and a left eye of an observer.

5. An image observing apparatus in which a light beam from outside and a light beam from display means are guided to an eye of an observer via optical path combining means to observe, in the same view field, outside image information based on the beam from outside and a display image displayed on the display means, said image observing apparatus comprising a spatial modulator having a two-dimensional pixel structure disposed in an optical path between said optical path combining means and the eye of the observer, said image observing apparatus further comprising control means for causing said spatial modulator to modulate at least a partial area thereof so as to permit switching of observation between the beam composing the outside image information and the beam composing said display image, and for controlling said spatial modulator so as to intercept or reduce the beam in an area of said outside image information in accordance with an area of said display image.

6. The image observing apparatus according to claim 5, wherein said spatial modulator comprises a transmission type liquid crystal panel.

7. An image observing system comprising a pair of image observing apparatuses as defined in claim 6, for a right eye and a left eye of an observer.

8. The image observing apparatus according to claim 5, wherein the beam composing the outside image information and the beam composing said display image are beams having respective polarization states different from each other.

9. An image observing system comprising a pair of image observing apparatuses as defined in claim 8, for a right eye and a left eye of an observer.

10. An image observing system comprising a pair of image observing apparatuses as defined in claim 5, for a right eye and a left eye of an observer.

11. An image observing apparatus arranged to observe, in the same view field, outside image information from outside and a display image displayed on display means via optical path combining means, said image observing apparatus comprising a spatial modulator having a two-dimensional pixel structure, the outside image information being observed via said spatial modulator, said spatial modulator selectively modulating a part or all of the display image and the outside image information in the same view field on an area basis, said image observing apparatus further comprising control means for complementing an area of the outside image information around the display image selectively modulated, with image information picked up by image pickup means for picking up outside image information eclipsed by said spatial modulator.

12. The apparatus according to claim 11, wherein said spatial modulator selectively modulates at least a part of the display image and the outside image information by utilizing polarization of the beams having different polarization states from each other.

13. An image observing system comprising a pair of image observing apparatuses as defined in claim 12, for a right eye and a left eye of an observer.

14. An image observing system comprising a pair of image observing apparatuses as defined in claim 11, for a right eye and a left eye of an observer.

* * * * *

UNITED STATES PATENT AND TRADEMARK OFFICE
CERTIFICATE OF CORRECTION

PATENT NO. : 6,271,895 B1
DATED : August 7, 2001
INVENTOR(S) : Akinari Takagi et al.

It is certified that error appears in the above-identified patent and that said Letters Patent is hereby corrected as shown below:

Column 1,
Line 51, "a" should be deleted; and "image" should read -- images --.

Column 4,
Line 43, "tight" should read -- right --.

Column 16,
Line 57, "110." should read -- 110 --.

Column 21,
Line 14, "denoted,by" should read -- denoted by --.

Signed and Sealed this

Twelfth Day of March, 2002

Attest:

Attesting Officer

JAMES E. ROGAN
Director of the United States Patent and Trademark Office

Disclaimer 6,271,895—Akinari Takagi, Yokosuka; Yoshihiro Saito, Hachioji; Naosato Taniguchi, Urawa; Toshiyuki Sudo, Kawasaki, all of Japan. IMAGE OBSERVING APPARATUS FOR OBSERVING OUTSIDE INFORMATION SUPERPOSED WITH A DISPLAY IMAGE. Patent dated August 7, 2001. Disclaimer filed June 3, 2002 by the assignee, Mixed Reality Systems Laboratory Inc.

Hereby enters this disclaimer to all of the claims (1-14).

*(Official Gazette, August 13, 2002)*